Jan. 21, 1941.   W. M. CARROLL   2,229,370
LIQUID DISPENSING APPARATUS
Filed Dec. 8, 1936   15 Sheets-Sheet 3
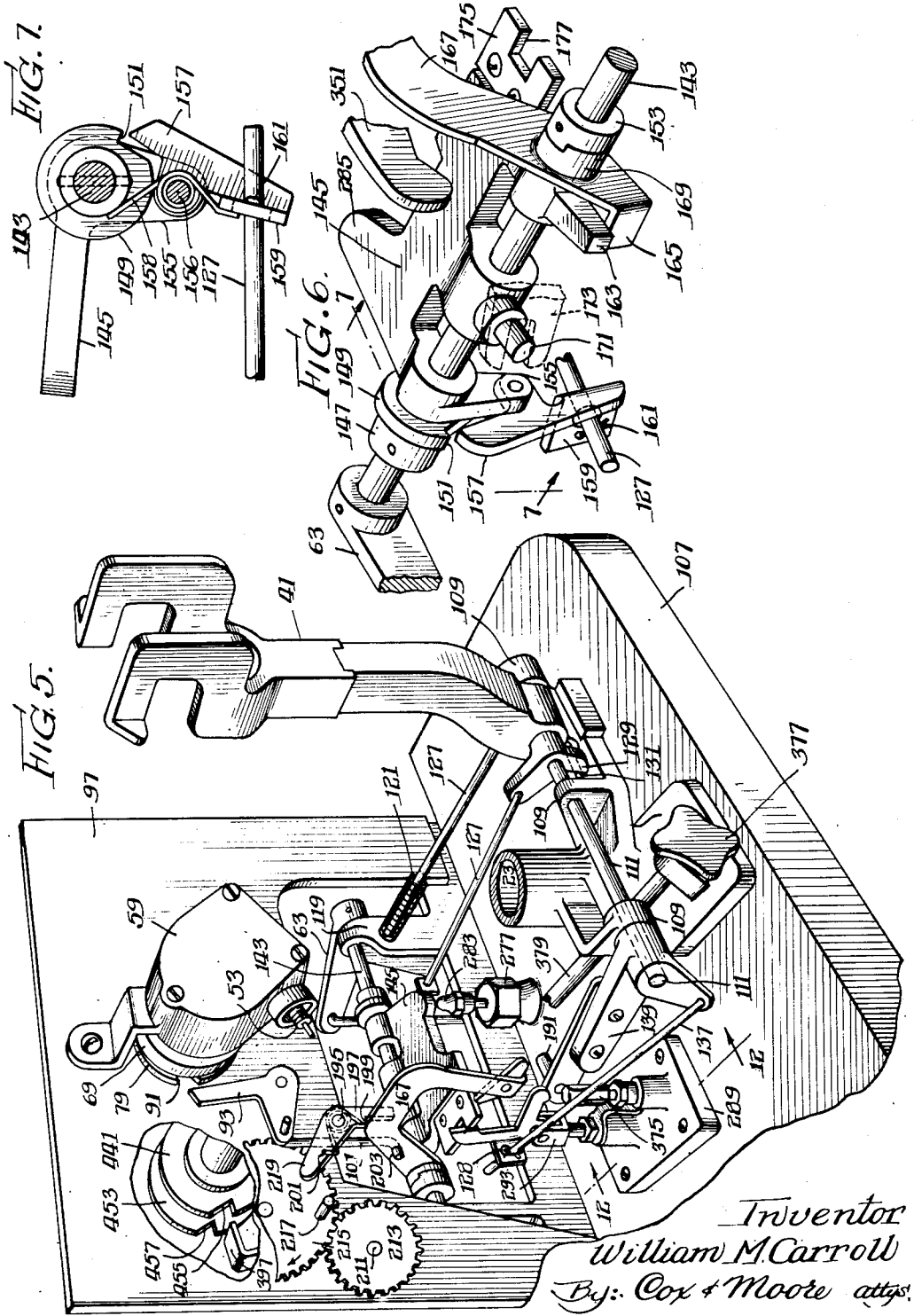
Inventor
William M. Carroll
By: Cox & Moore attys.

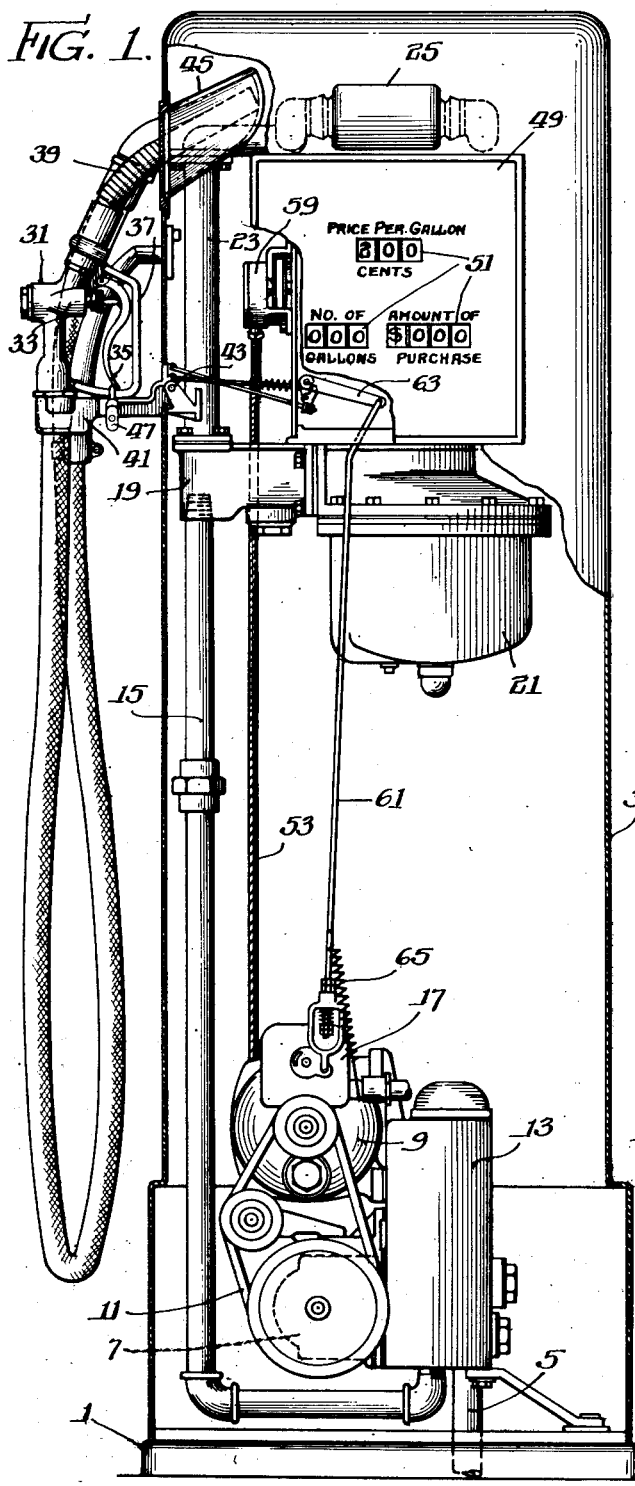
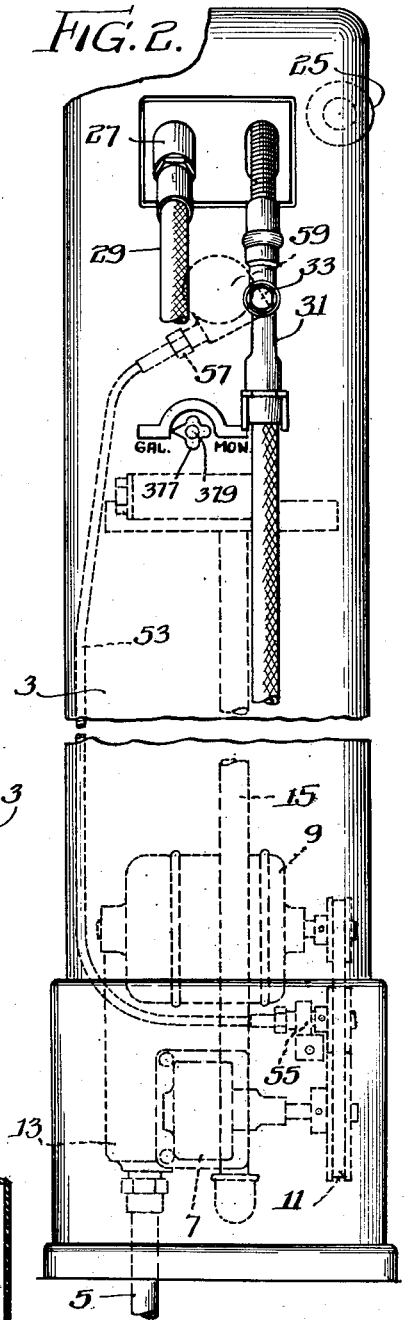

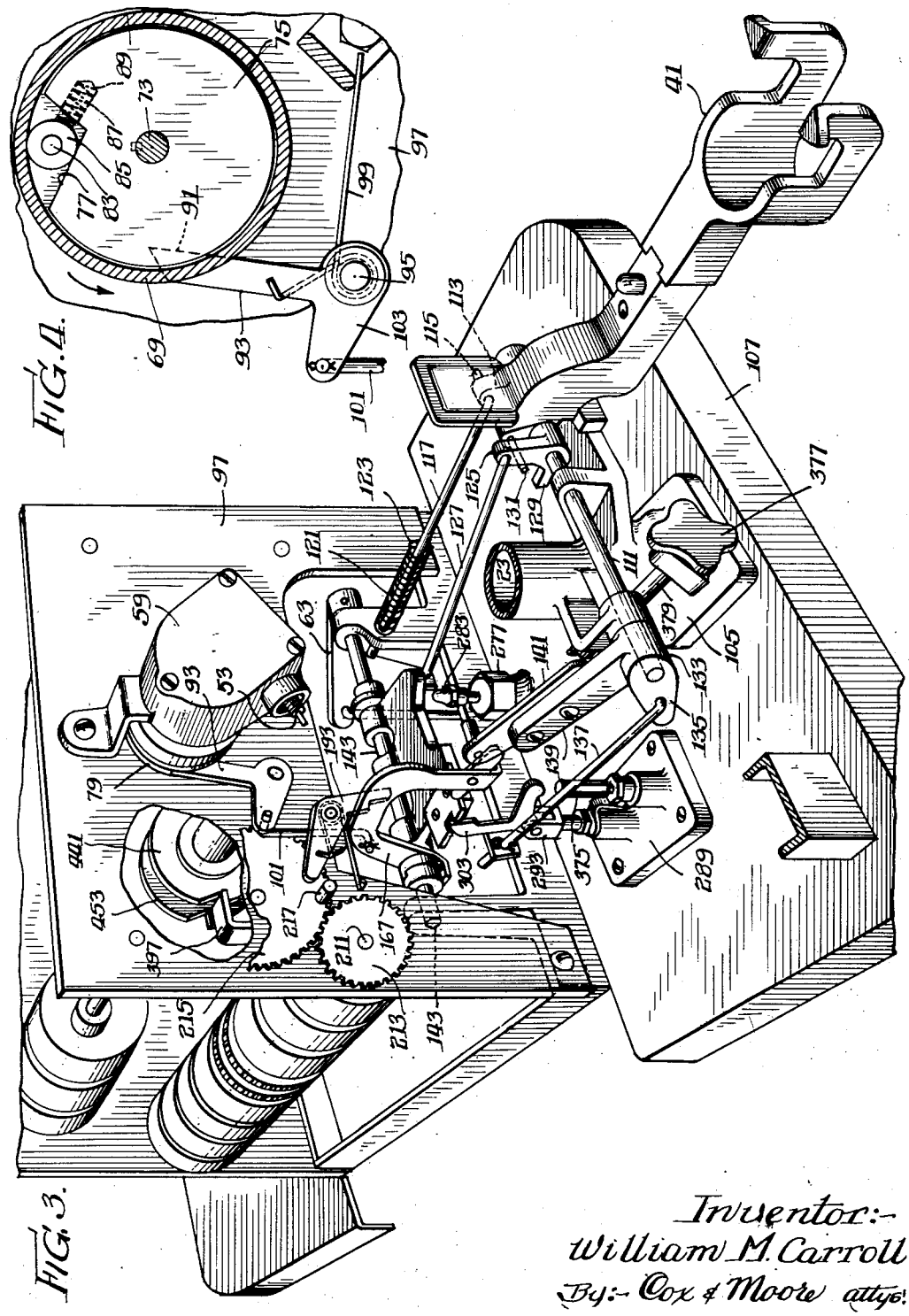

Jan. 21, 1941. W. M. CARROLL 2,229,370
LIQUID DISPENSING APPARATUS
Filed Dec. 8, 1936 15 Sheets-Sheet 4
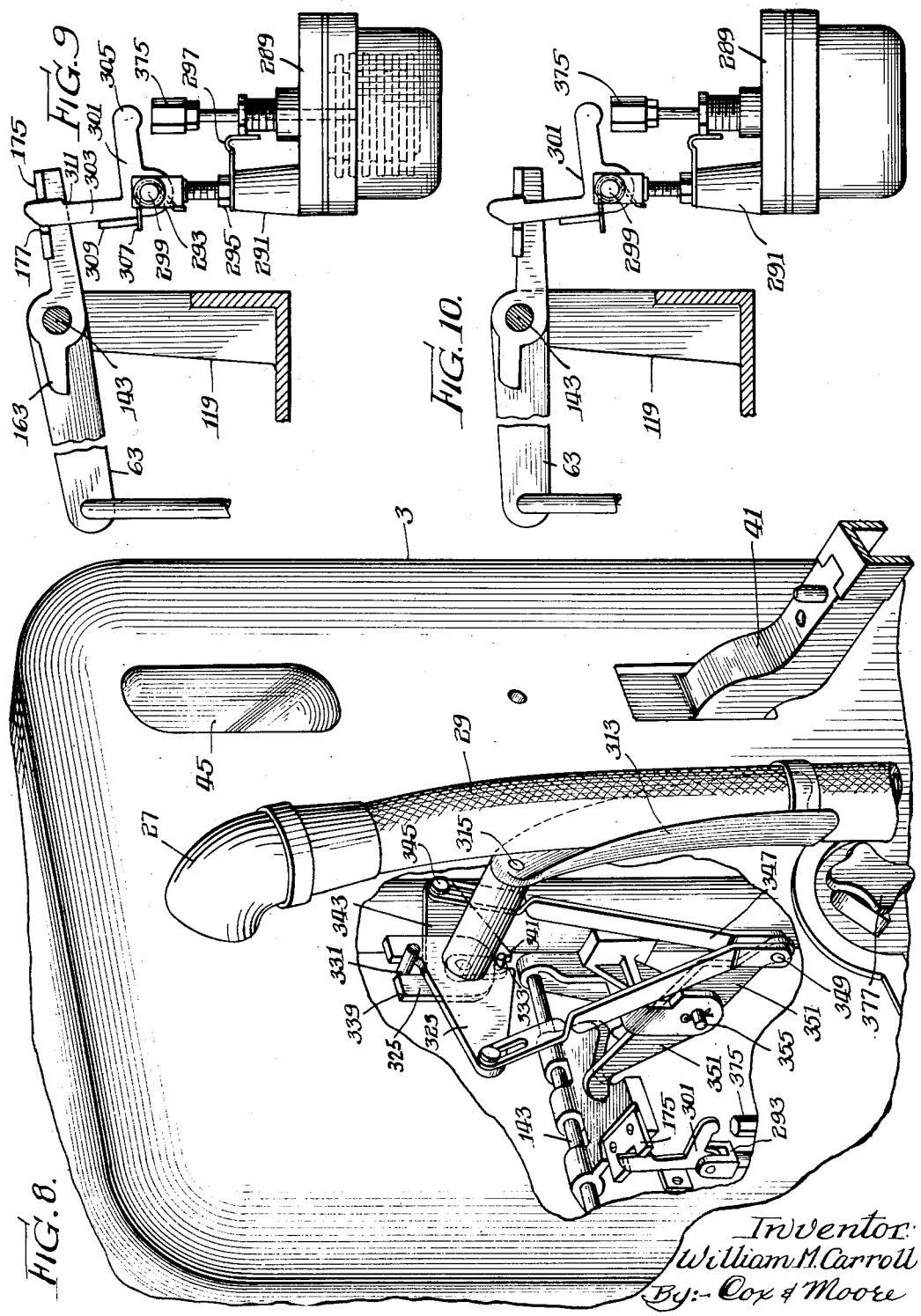
Inventor
William M. Carroll
By:- Cox & Moore

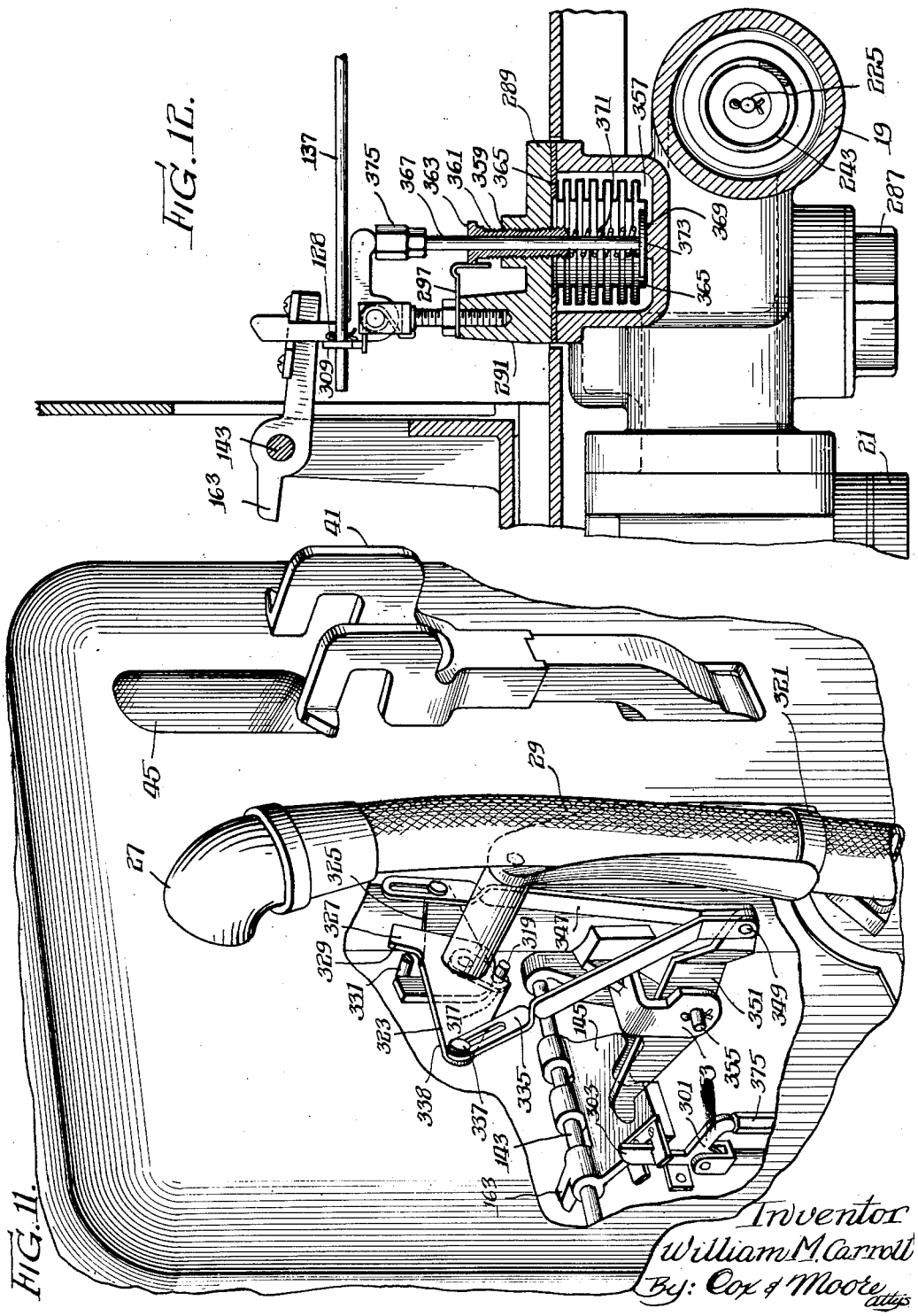

Jan. 21, 1941.   W. M. CARROLL   2,229,370
LIQUID DISPENSING APPARATUS
Filed Dec. 8, 1936   15 Sheets-Sheet 6

Inventor:
William M. Carroll
By: Cox & Moore attys

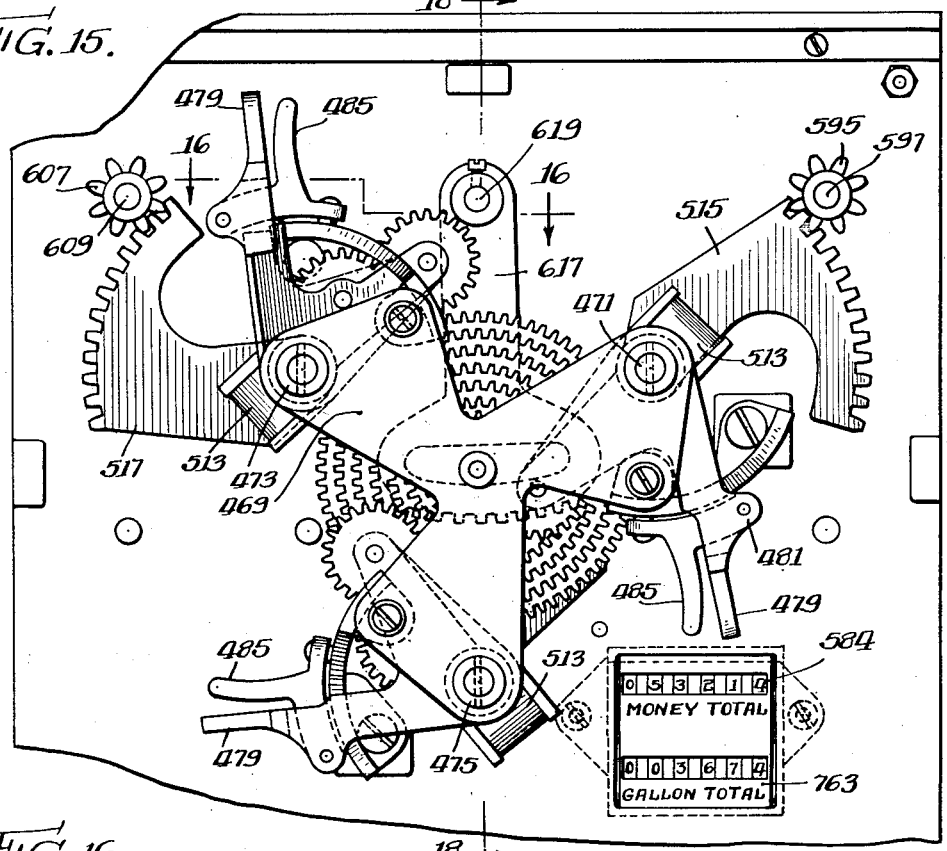
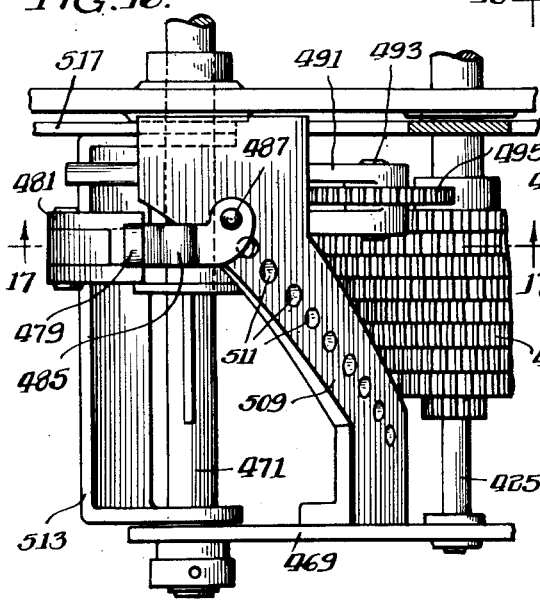
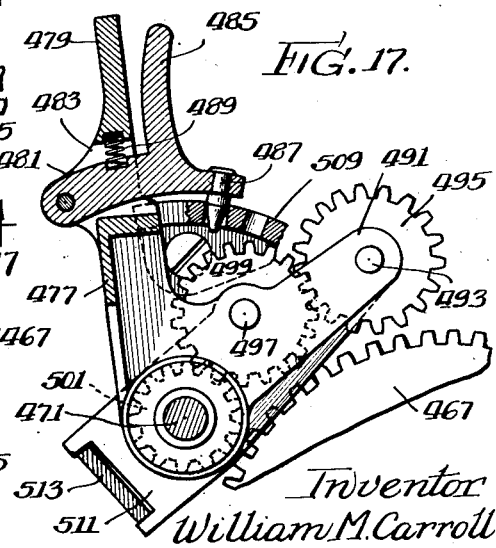

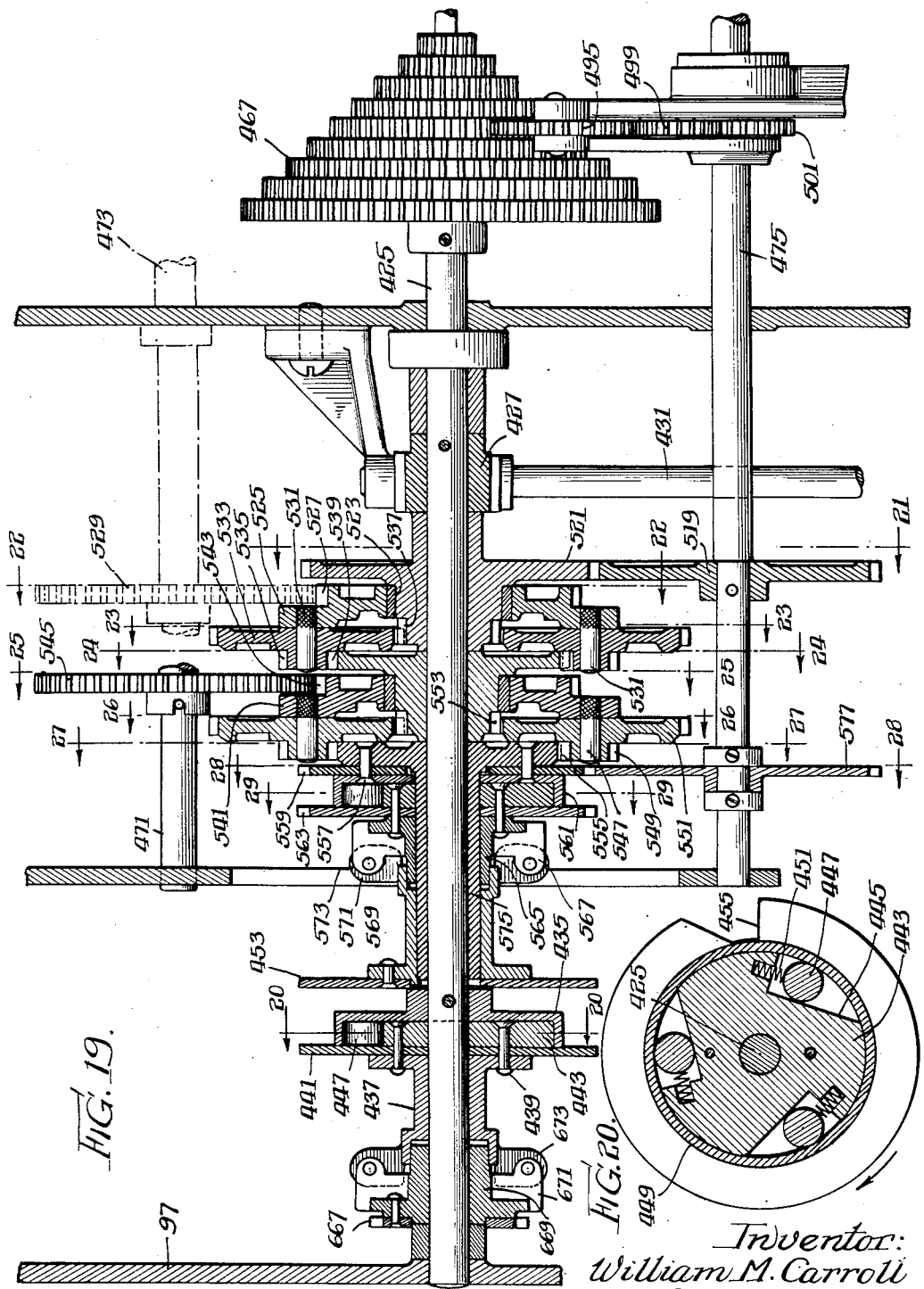

Jan. 21, 1941.  W. M. CARROLL  2,229,370
LIQUID DISPENSING APPARATUS
Filed Dec. 8, 1936  15 Sheets-Sheet 10
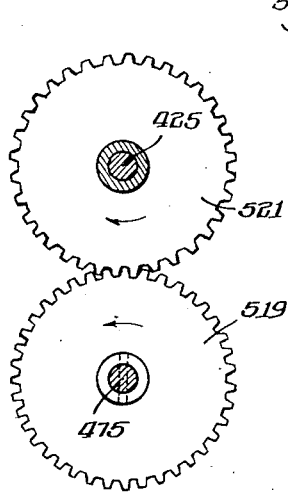
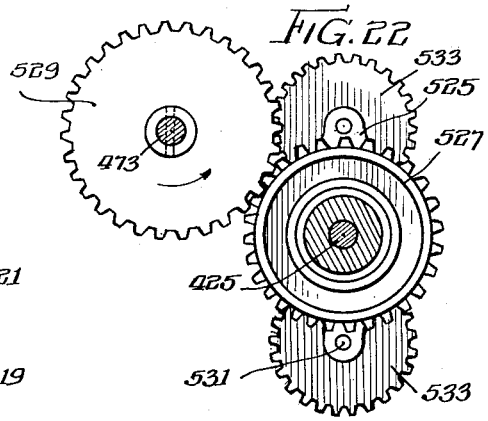
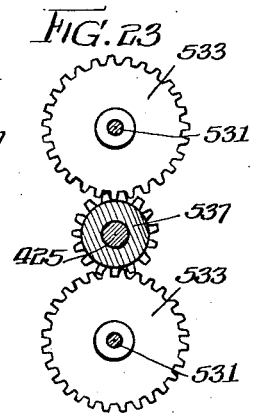
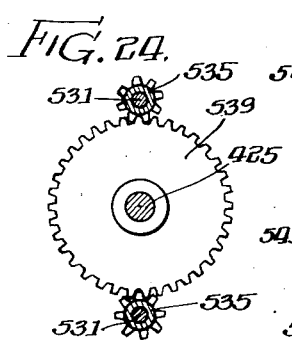
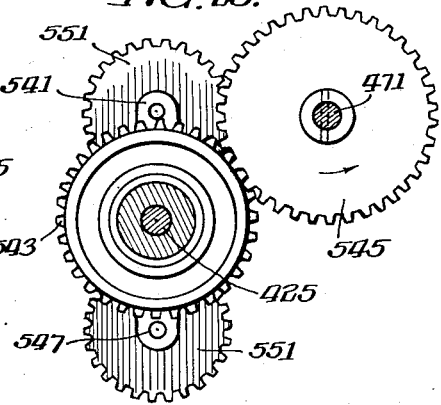
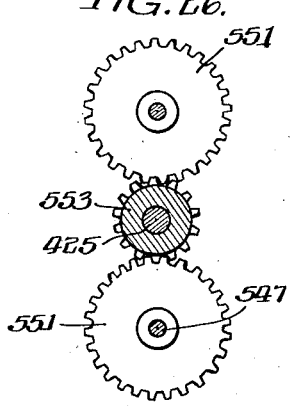
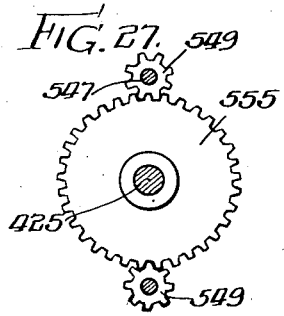
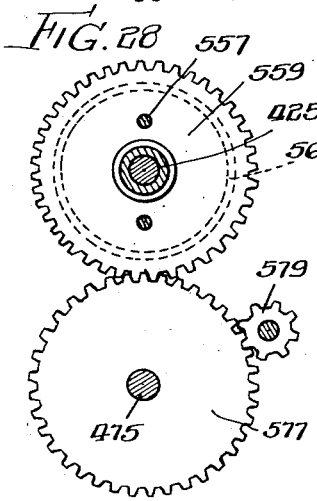
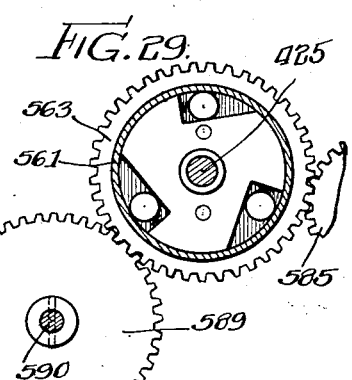
Inventor
William M. Carroll
By: Cox & Moore attys.

Jan. 21, 1941.   W. M. CARROLL   2,229,370
LIQUID DISPENSING APPARATUS
Filed Dec. 8, 1936   15 Sheets-Sheet 11

Inventor:
William M. Carroll
By:- Cox & Moore attys

Jan. 21, 1941.  W. M. CARROLL  2,229,370
LIQUID DISPENSING APPARATUS
Filed Dec. 8, 1936  15 Sheets-Sheet 12

Inventor:
William M. Carroll
By:— Cox & Moore attys.

Jan. 21, 1941.                    W. M. CARROLL                    2,229,370
                           LIQUID DISPENSING APPARATUS
                    Filed Dec. 8, 1936            15 Sheets-Sheet 13
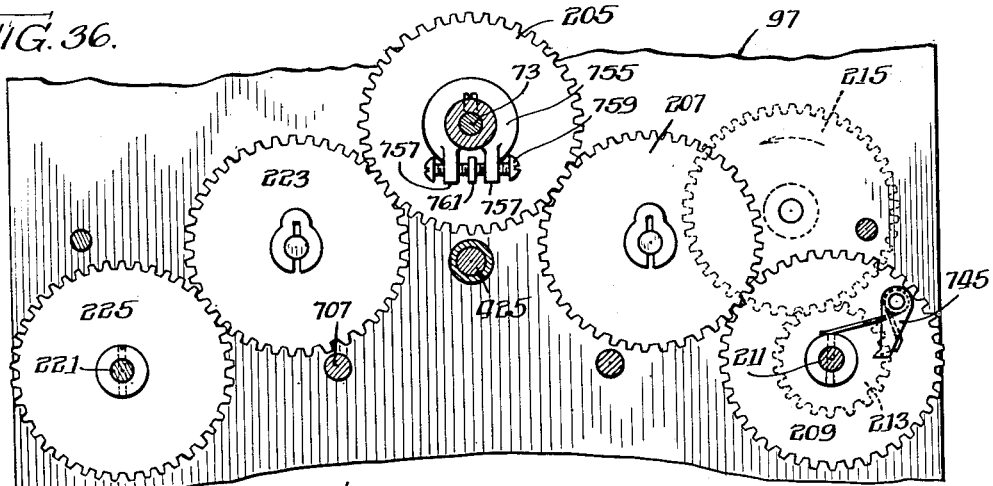
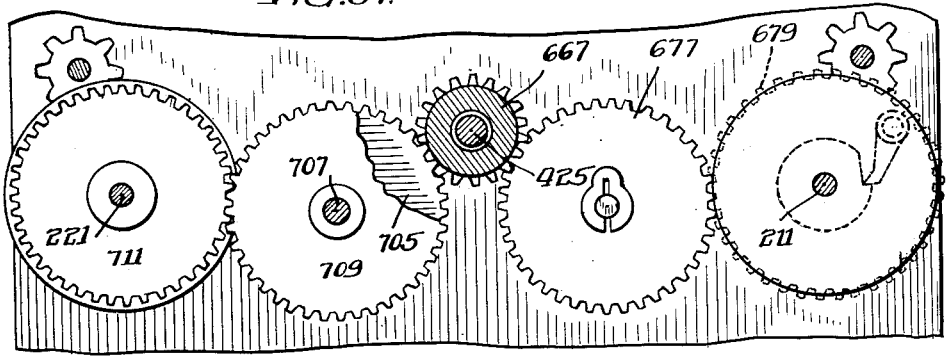
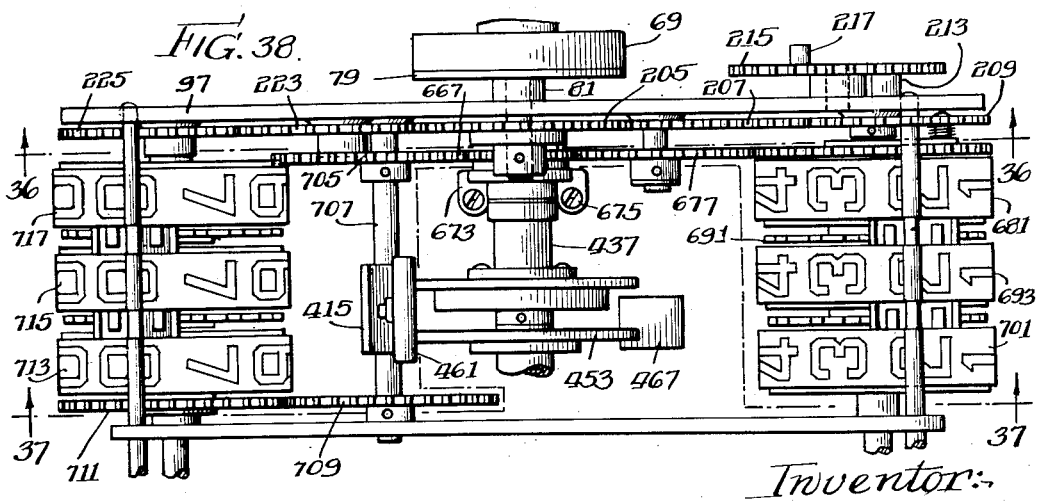
Inventor:-
William M. Carroll
By:- Cox & Moore attys.

Jan. 21, 1941.   W. M. CARROLL   2,229,370
LIQUID DISPENSING APPARATUS
Filed Dec. 8, 1936   15 Sheets-Sheet 14

Inventor:
William M. Carroll
By: Cox & Moore attys

Jan. 21, 1941.  W. M. CARROLL  2,229,370
LIQUID DISPENSING APPARATUS
Filed Dec. 8, 1936  15 Sheets-Sheet 15
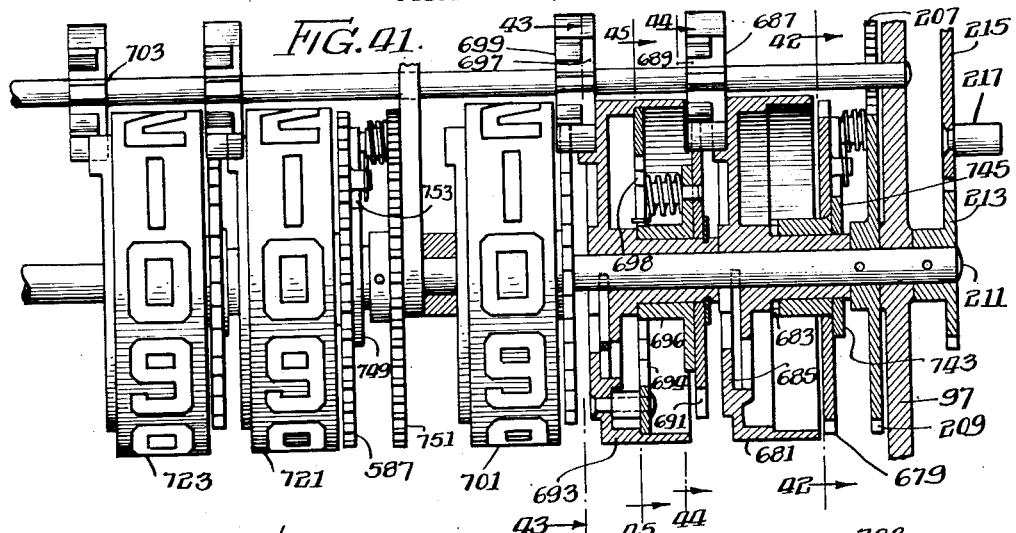
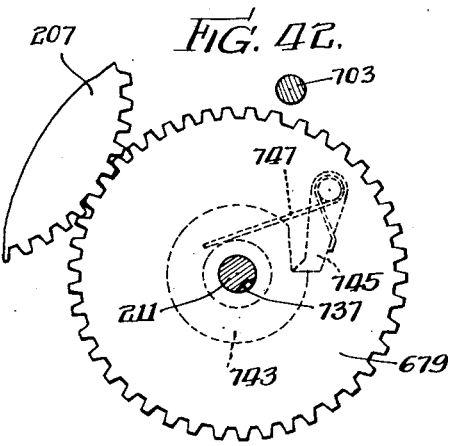
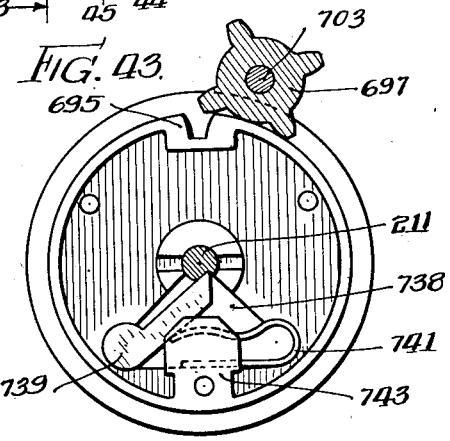
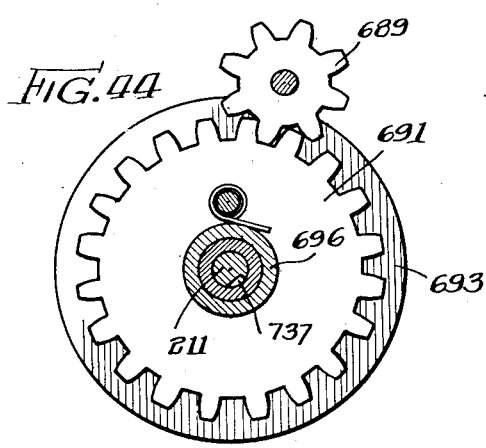
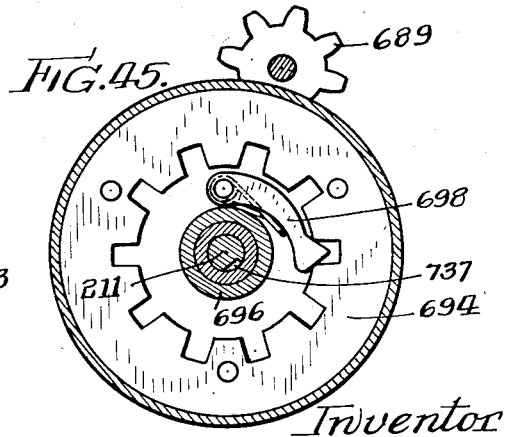
Inventor
William M. Carroll
By: Cox & Moore attys Patented Jan. 21, 1941

2,229,370

UNITED STATES PATENT OFFICE 2,229,370

LIQUID DISPENSING APPARATUS

William M. Carroll, Fort Wayne, Ind., assignor to S. F. Bowser & Company, Incorporated, Fort Wayne, Ind., a corporation of Indiana Application December 8, 1936, Serial No. 114,807

18 Claims. (Cl. 221—95)

The objects of my invention are as follows:

To provide a fluid dispensing mechanism by means of which mechanical measurement of fluid in terms of units of quantity or of money may be effected.

To provide a fluid dispensing mechanism which may be conditioned during a dispensing operation to terminate such operation when a quantity of fluid then being dispensed becomes an exact unit quantity or becomes the exact equivalent of a monetary unit.

To provide a fluid dispensing mechanism whereby an operator may select prior to the dispensing operation, the unit either volumetric or monetary, in which mechanical measurement is to be effected.

To provide a fluid dispensing mechanism whereby after a dispensing operation has been terminated by mechanical means, further dispensing may be effected.

To provide a fluid dispensing mechanism wherein operation of the means for selecting the units in terms of which mechanical measurement is to be effected, is permitted at any time prior to conditioning of the mechanical measurement device for terminating the dispensing.

To provide a fluid dispensing mechanism in which mechanical measurement of fluid in terms of half gallon or of five cent increments is effected.

To provide in a fluid dispensing apparatus, a device for terminating the dispensing operation which comprises a pair of discs and a stop pawl which is movable into cooperative relation with one or the other of the discs.

To provide, in a fluid dispensing apparatus, a device for terminating the operation thereof which comprises an element driven in accordance with the quantity dispensed and another element driven in accordance with the value of the fluid being dispensed and a mechanism which is adapted to cooperate with one or the other of the elements to terminate the dispensing.

To provide, in a fluid dispensing apparatus, a mechanism for resetting the indicating registers to zero by power.

To provide a resetting mechanism wherein once the operation is initiated it automatically goes on to completion.

To provide a power resetting mechanism which is not under control of the operator once resetting has been initiated.

To provide power resetting means which are driven from the pump motor.

To provide, in a fluid dispensing apparatus, interlocking means which require the initiation of operation of the resetting means before fluid can be dispensed from the apparatus.

To provide, in a fluid dispensing apparatus, mechanism operable by the hose hook when the latter is moved to one position, to start the resetting operation and operable by the hose hook when it is in a different position to entirely disable the apparatus.

To provide, in a fluid dispensing apparatus a motor driven resetting mechanism which automatically shuts off the motor when resetting is completed.

To provide, in a fluid dispensing apparatus, a power driven resetting mechanism which at the completion of its operation leaves the apparatus in condition for an ensuing dispensing operation.

To provide a resetting mechanism which zeroizes the registers and conditions the mechanical measurement mechanism for accurate operation.

To provide means for indicating the price at which the cost computing mechanism is operating.

To provide price indicating means which are adjusted simultaneously with the cost computing mechanism.

To provide interlocking means whereby the price indicating mechanism will be constrained to display the price at which the cost computing mechanism is computing.

To provide means in a dispensing apparatus for controlling both the fluid supplying means and the flow of fluid through the apparatus.

To provide means in a dispensing apparatus for maintaining a portion of the dispensing line full of liquid.

To provide a combined check and pressure relief valve for maintaining a portion of the dispensing line full of liquid under a predetermined pressure.

To provide mechanism which is operated by super by-pass pressures for conditioning the mechanical measurement mechanism for operation.

To provide mechanism in the dispensing line which is adapted to be operated only upon the creation of super by-pass pressures in the line for releasing the flow controlling means.

To provide means for latching the flow control means in operated position when they are operated to initiate dispensing of fluid.

To provide two separate mechanisms for operating the flow control means, together with mechanism which requires the operation of one mechanism to precede the operation of the other.

To provide two separate mechanisms for operating the flow control means, together with means requiring the operation of one to precede the operation of the other and thereafter permitting successive operations of said other mechanism.

To provide two separate mechanisms for operating the flow control means, together with means requiring the operation of one mechanism to precede that of the other and thereafter permitting successive operations of said other mechanism until said first named mechanism is returned to its unoperated position.

Figure 1 is a front elevation of the dispensing device with parts of the housing broken away.

Figure 2 is a side elevation of the dispensing device.

Figure 3 is a perspective view of the control mechanism with the parts in the normal or unoperated positions.

Figure 4 is a detail section of the driving clutch for the resetting mechanism.

Figure 5 is a perspective view of the control mechanism with the parts in position to initiate resetting.

Figure 6 is a perspective detail view of part of the control mechanism.

Figure 7 is a detail section of part of the control mechanism taken on the line 7—7 of Figure 6.

Figure 8 is a view showing the hose pull mechanism in normal or unoperated position and its relation to the control mechanism.

Figure 9 is an elevation showing the latching mechanism and its releasing device in the normal inactive position.

Figure 10 is a view similar to Figure 9 but with the parts in the position occupied during resetting.

Figure 11 shows the hose pull mechanism in its operated or flow starting position.

Figure 12 is a section taken on line 12—12 of Figure 5 showing the latch in active position and the details of the Sylphon.

Figure 15 is an elevation of the variable speed mechanism.

Figure 16 is a detail view of the mechanism of Fig. 15 with parts broken away taken on the line 16—16 of Figure 15.

Figure 17 is a detail section of a unit of the variable speed mechanism taken on the line 17—17 of Figure 16.

Figure 19 is a detail section of the variable speed mechanism showing the compound differential gearing and predetermining discs.

Figure 20 is a detail view of the predetermined quantity disc and its clutch taken on the line 20—20 of Figure 19.

Figure 21 is a section taken on line 21—21 of Figure 19 showing the drive to the first sun gear.

Figure 22 is a section taken on the line 22—22 of Figure 19 showing the drive to the spider of the first planetary gears.

Figure 23 is a section taken on the line 23—23 of Figure 19 showing the drive between the first sun gear and first set of planetary gears.

Figure 24 is a section taken on the line 24—24 of Figure 19 showing the drive between the first set of planetary gears and the second sun gear.

Figure 25 is a section taken on the line 25—25 of Figure 19 showing the drive to the spider of the second set of planetary gears.

Figure 26 is a section taken on the line 26—26 of Figure 19 showing the drive between the second sun gear and the second set of planetary gears.

Figure 27 is a section on the line 27—27 of Figure 19 showing the drive between the second set of planetary gears and the final drive gear.

Figure 28 is a section taken on the line 28—28 of Figure 19 showing the drive train leading to the total money accumulator.

Figure 29 is a section taken on the line 29—29 of Figure 19 showing the drive to the total price dials.

Figure 36 is a section taken on the line 36—36 of Figure 38 showing the gear trains of the resetting mechanism.

Figure 37 is a section taken on the line 37—37 of Figure 38 showing the gear trains of the gallonage register.

Figure 38 is a plan showing the predetermining discs and stop, and the gear trains of the resetting mechanism and gallonage register.

Figure 41 is an elevation partly in section showing the gallonage and cost registers.

Figure 42 is a section taken on the line 42—42 of Figure 41 showing the drive to the register dials of the lowest order.

Figure 43 is a section taken on the line 43—43 of Figure 41 showing part of the transfer mechanism and the resetting connections.

Figure 44 is a section taken on the line 44—44 of Figure 41 showing another part of the transfer mechanism.

Figure 45 is a section taken on the line 45—45 of Figure 41 showing the connection between the transfer mechanism and the higher order dial.

GENERAL DESCRIPTION FIGURES 1 AND 2

Figure 13:
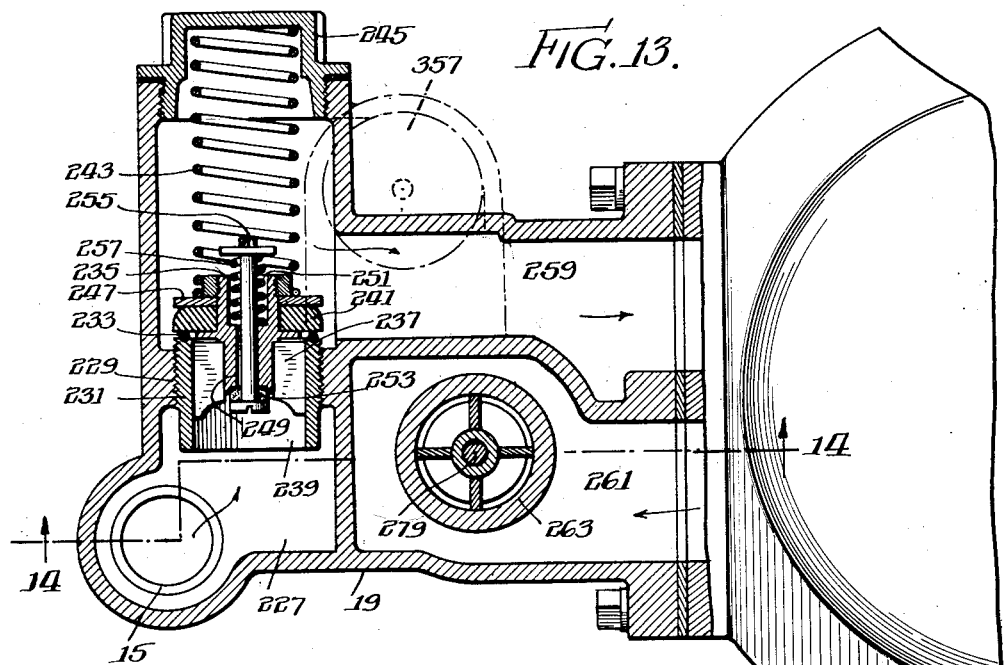
Figure 13 is a detail sectional view of the combined by-pass and relief valve taken on the line 13—13 of Figure 14.

In Figure 1 is disclosed a liquid dispensing unit adapted for use in dispensing chiefly gasoline at the ordinary service stations. This device comprises a base 1 and an upstanding housing 3 which surrounds the internal mechanisms of the device, which are mounted upon a frame of any suitable type. A suction pipe 5 is connected to an underground tank or reservoir (not shown) in which the gasoline is stored. At its other end this pipe is connected with a pump 7 which is driven from an electric motor 9 by means of belt gearing 11. The pump has a by-pass valve which opens when a predetermined pressure is built up in the discharge line and permits flow of fluid therefrom to the suction side of the pump. Such structure is well known in the art and need not be described. An air release 13 is connected to the discharge side of the pump and receives the liquid discharged by said pump. Any air which has been delivered by the pump is separated from the gasoline in this air release device and only gasoline is discharged into the meter inlet conduit 15. A suitable switch 17 is provided for controlling the motor.

The conduit 15 discharges into a valve body 19 which contains relief, check and control valves later to be described. A meter 21 of any suitable type, but preferably of the positive displacement type described in Patent No. 1,977,424 by H. L. Blum, is connected to receive liquid from the valve body 19. Fluid measured by the meter is discharged into a conduit 23 by which it is conducted to the sight glasses 25 and thence to an outlet connection 27 to which is affixed the discharge conduit 29 which is a flexible hose.

The hose terminates in a nozzle 31 of any desired construction, but which comprises a valve 33 adapted to be operated by a trigger 35. The trigger is provided with a guard 37 and the nozzle terminates in a spout 39 which is preferably of the flexible tube type. A hose hook 41 is pivoted on the frame for motion through an angle of approximately ninety degrees from a horizontal to a vertical position. In the horizontal position it is adapted to receive and retain the nozzle when the latter is not being used. When the nozzle is in position on the hose hook the flexible tip is received in a recess 45 of the housing 3. A padlock 47 may be passed through its trigger guard 37 and the hose hook 41 immediately behind the trigger 35 so that the nozzle can not be removed from the hose hook, the hose hook can not be operated, and operation of the trigger is prevented.

Housing 3 is provided with a dial 49, which is perforated to display number wheels of the dial type as shown at 51. Details of the register will be discussed below. A flexible shaft 53 is connected at 55 to be driven from motor 9 and the upper end of the shaft is connected as at 57 to the reset gear case 59. A switch operating rod 61 is connected at its upper end to a lever 63 later to be described, and a spring 65 is connected to said rod and anchored in such a manner as to tend to draw the rod downwardly to move the switch to its off or on position.

POWER RESETTING MECHANISM

Figures 1 to 7 inc., 18, 36 and 41

Power is transmitted from the flexible shaft 53 through the gears in case 59 to the driving member 67 of the clutch shown in detail in Figure 4. The driving member comprises an annular flange 69 which is fixed to a hub 71 extending from the gear case just described. A shaft 73 is located axially of said hub and flange and has keyed to it the driven member 75 which is provided with a V-shaped notch 77, as shown in Figure 4. A disk 79 is fixed to a hub 81 which is mounted for rotation relative to shaft 73. The disk is provided with a pin 83 (Fig. 4), which extends into and parallel with said flange 69. A roller 85 is mounted to rotate on pin 83 and is adapted to be received in the notch above described. A spring 87 is seated in a hole 89 which is formed in one edge of the V-notch 77. Spring 87 is adapted to bear against roller 88 and tends to force it into contact with the other edge of notch 77. Disk 79 is provided with a notch 91 which is adapted to receive a pawl 93 which is pivoted at 95 to a portion of the clock frame 97. A spring 99 is applied to pawl 93 to bias it toward notch-engaging position. A link 101 depends from an arm 103 for a purpose to be described.

A bracket 105 is supported on a base member 107 and is provided with bearings 109 on which is journalled a shaft 111. Hose hook 41 is fixed to rotate said shaft through an angle of approximately ninety degrees as the hook is raised or lowered. A lug 113 is formed on the hose hook as shown in Figure 3, and is perforated to receive the bent-over end 115 of a rod 117, which passes through an opening in the bracket 119. A spring 121 is supported on rod 117 and bears at one end against bracket 119 and at its other end against a pin 123 which passes through shaft 117. Loosely mounted on shaft 111 is a bell crank having an arm 125 which is perforated to receive the bent-over end of a rod 127 which extends in the general direction of the rod 117 for a purpose to be described. The other arm 129 of said bell crank extends substantially at right angles to the arm 125. A pin 131 is fixed at one end in a lug which forms a part of a hose hook 41, while the other or free end of said pin extends to a position where it may be contacted by one or the other of said arms 125 or 129.

At the end of shaft 111 opposite to that to which the hose hook is fixed is attached a hub 133. An arm 135 is integral with said hub and is perforated to receive the bentover end of rod 137. A second arm 139 having an extension 141 attached thereto is also formed integrally with said hub 131.

Bracket 119 is provided with bearings in which is mounted a freely rotatable shaft 143. A switch lever 63 mentioned above is fixed to one end of said shaft 143 (see Fig. 6). An operating lever 145 is mounted for free rotation about shaft 143. A hub 147 is pinned to shaft 143 and carries a disk 149 which is notched as at 151; a clutch element 153 is also pinned to rotate with said shaft. Control lever 145 is provided with a depending arm 155, at the outer end of which is mounted by means of a pivot pin 156, the pawl 157. Surrounding the pin is a spring 158 which serves to bias the pawl in a counterclockwise direction as shown in Figure 7.

The pawl just described lies in the same plane as disk 149 and is adapted to engage the notch 151 thereof. The tail of the pawl is provided with a bent-over ear 159 to slidably receive the end of rod 127. A pin 161 is passed through the rod between the end thereof and the ear 159. A projection 163 is formed integrally with the control lever 145 and is adapted to engage the bent-over ear 165 on a lever 167. Fixed to said lever 167 and concentric with shaft 143 is a clutch element 169 which engages the clutch element 153 described above. A pin or projection 171 is mounted integrally with lever 145 and is adapted to engage a slotted arm 173 which forms a portion of the mechanical measurement mechanism to be described.

Figure 18:
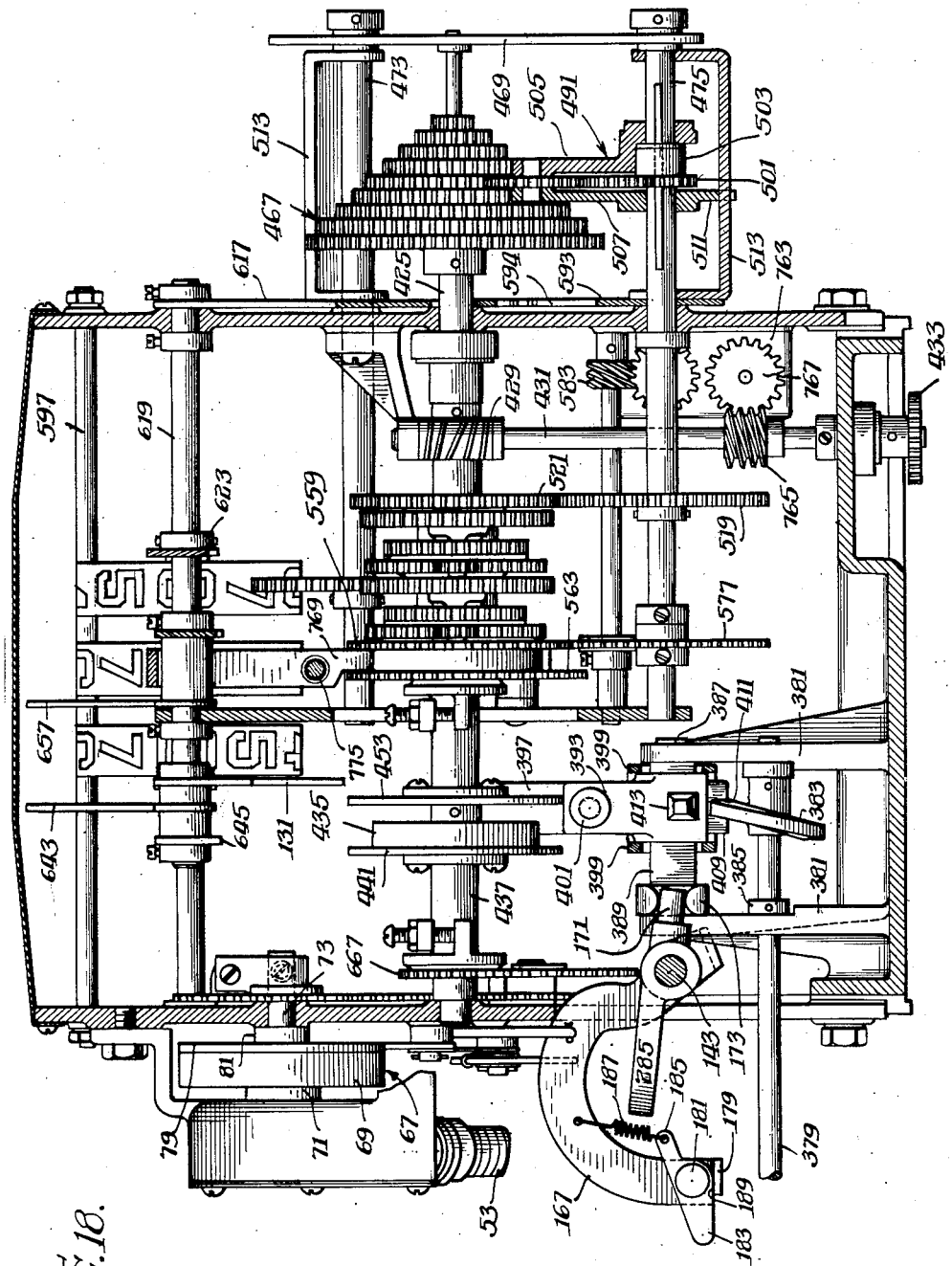
Figure 18 is a detail vertical section of the clock mechanism taken on the line 18—18 of Figure 15.

Attached to one edge of the control lever is a plate 175 which is provided with a square notch 177. The lever 167 is provided with a bent-over ear 179 (Fig. 18). Pivoted at 181 to this end of said lever is a pawl 183. A lever 185 on said pawl is connected to a spring 187 which biases said pawl in a counterclockwise direction. The pawl is formed with a flat side 189, which is adapted to bear against the ear 179 under action of spring 187. Pawl 183 is free to rotate in a clockwise direction (Fig. 18), a substantial distance. A pin 191 fixed to arm 141 normally overlies pawl 183 as is shown in Figure 3. A lever 193 is pivoted to the clock frame 97 at 195. One arm 197 of said lever is notched as at 199 (Fig. 5) and the notch is adapted to snap into position above the lever 167 under action of a spring 201 as the lever 167 is depressed. A link 101 mentioned above, is bent laterally at its lower end and is received in an opening 203 in lever 167 (see Fig. 5).

Referring to Figure 36, reset shaft 73 drives gear 205. The motion of this gear is transmitted through gears 207, 209, shaft 211 and gears 213, 215 to pin 217, shown in Figure 5, which is adapted during its rotation to engage the arm 219 of the lever pivoted at 195, to release lever 167 from shoulder 199. Shaft 211 mentioned above serves as the reset shaft for the total registers on one side of the machine while the shaft 221 (Fig. 36) serves as the reset shaft for the total registers on the other side of said machine. Shaft 221 is driven from gear 205 by means of gears 223 and 225.

OPERATION OF POWER RESET MECHANISM

In order to reset the dispensing apparatus for a dispensing operation the attendant will swing the hose hook 41 from the position shown in Figure 3 to that shown in Figure 5. Rod 117 will be displaced because of the eccentricity of lug 113 to compress the spring 121 between bracket 119 and the pin 123. With the hose hook in its vertical position the lug 113 will carry the bent-over end 115 of rod 117 slightly below the center line of shaft 111, thus enabling spring 121 to maintain the hose hook in upper or actuating position. As the hose hook is moved to the vertical position, pin 131 carried by a second eccentric boss on the hose hook picks up lever 129 and rotates it and lever 125 about shaft 111 to force rod 127 forwardly. This motion moves pin 161 (Fig. 6) away from the ear 159 and permits pawl 157 to rotate under action of spring 158 into engagement with the notch 151 of disk 149 as shown in Figure 7.

The rotation of shaft 111 just described also causes the rotation of lever 135, which in turn exerts a pull on rod 137 to free a latch which will be described later. The other arm 139 on hub 133 together with its extension 141 and the pin 191 will be depressed by the aforesaid rotation of shaft 111. Pin 191 forces pawl 183 of Figure 18 downwardly and since said pawl is not free to rotate in this direction the arm 167 will also be depressed. As a result of this motion of arm 167 and because of the clutch 169—153 shown in Figure 6, shaft 143 will receive a clockwise rotation which is transmitted to the arm 63, which in turn moves the switch rod 61 to close the motor switch, thus setting the motor 9 into operation.

Through the flexible coupling 53, motion of the motor is transmitted to the gears in the gear case 59 and the driving member 71. It will be noted that as lever 167 is depressed the link 101 is drawn downwardly and the pawl 93 is withdrawn from the notch 91 of the control member 79; consequently, prior to the operation of the motor switch the spring 87 will have jammed roller 85 into contact with one edge of the V-notch 77 in control member 75 and flange 69.

When the latter member is driven from the motor as just described, motion will be transmitted in the counter clockwise direction (Fig. 4) to the element 75 and to shaft 73. The motion of shaft 73 is transmitted through the gearing disclosed in Figure 36 to the reset shafts 211 and 221 and also to the gear 215 which carries pin 217. As resetting progresses, pin 217 will rotate in a clockwise direction (Fig. 5) until it contacts the lever 219 and rotates it together with lever 197 in a counterclockwise direction about pivot 195. It will be noted that lever 167 in passing from the Figure 3 to the Figure 5 position will have been depressed sufficiently to permit notch 199 of lever 197 to swing into position over it under the action of spring 201. Thus when the pin 191 passes over the end of pawl 183 in moving toward its lowermost position and frees said pawl, the latch formed by lever 197 and shoulder 199 will maintain lever 167 depressed to hold the switch in its closed position. Contact between pin 217 and lever 219 as described above will free lever 167 from the restraint of shoulder 199 and permit the shaft 143 to rotate in a counterclockwise direction (Fig. 6) under the action of the switch spring 65, rod 61 and switch lever 63 until pawl 93 engages the edge of disk 79. The parts will be held in this position until the pawl 93 drops into the notch at which time the shaft 143 will be free to rotate to its fully returned position to shut off the motor. The relation of the notch in disk 79 to the counters is such that the latter will rest with their zero numerals visible through clockface 49 when pawl 93 is seated in its notch. Thus at the completion of the resetting operation the motor has been shut off and all of the parts come to rest awaiting the operation of the flow initiating mechanism.

FLOW INITIATING AND MAINTAINING MECHANISM (Figs. 1—3—5—6—8—11—12—13—14)

Figure 14:
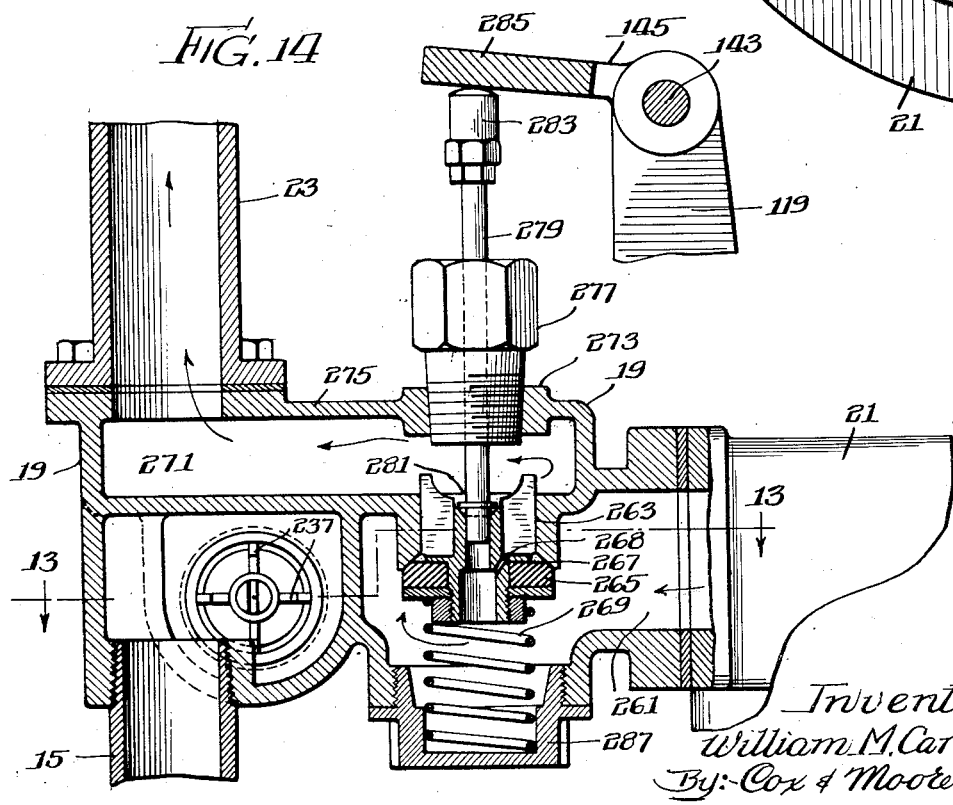
Figure 14 is a detail section of the control valve taken on the line 14—14 of Figure 13.

Referring to Figures 13 and 14, valve body 19 is shown in detail. The conduit 15 discharges into a chamber 227 which is provided with a threaded port 229 in which is located a bushing 231 having a valve seat 233. A hollow valve stem 235 having guide portions 237, which contact the bore 239 of said bushing, supports a valve 241 in position to contact seat 233 to close the bore 239. A spring 243 is compressed between a plug 245 in said valve body and a shoulder 247 maintained on the valve stem. Said valve stem is provided with a bore 249 which is counter bored as at 251 at its upper end. Said stem is also counter bored at its lower end to receive the valve 253 which is mounted on a rod 255 loosely passing through bore 249 and biased in a valve closing direction by a spring 257, which is confined between the shoulder formed by the counter bore 251 and the disk pinned to the valve rod 255. It will be noted that the valve 241 is adapted to be opened as liquid flows from chamber 227 into a chamber 259 under influence of pump 7 and that it will serve as a check valve to prevent flow of liquid in the opposite direction. The valve 253 will open to permit flow of fluid from chamber 259 back into the chamber 227 and thus serves as a pressure relief valve.

Chamber 259 is connected to the inlet chamber of the meter 21. A chamber 261 also in the valve body 19 is connected to the outlet chamber of the meter and is provided with a port 263, which is closed by a valve 265, which cooperates with a seat 267 at the inner edge of the port. A spring 269 urges the valve towards its closed portion. A small hole 268 connects chambers 261 and 271 so as to equalize the pressures therein.

A chamber 271 is provided on the other side of port 263 and adapted to connect said port and chamber 261 with the outlet conduit 23. A boss 273 is provided in the wall 275 of chamber 271 at a point directly above port 263. A threaded opening in said boss receives a packing gland 277 to permit the passage of a push rod 279 into the chamber 271. The lower end of said rod is formed with a collar which is adapted to engage the stem of valve 265 so that if the rod 279 were depressed the valve 265 would be forced open against the action of its spring 269. An adjustable tappet 283 is mounted on the outer end of rod 279 and is adapted to be engaged and depressed by a projection 285 on the control lever 145. The spring 269 is compressed between valve 265 and a plug 287 which is threadedly engaged in the valve body 19.

In Figures 9 and 10 is shown a cap member 289 which has an upstanding boss 291 into which is threaded the shank of a yoke 293. The yoke is held in its adjusted position by means of a jam nut 295, which is tightened down on a spring 297 to draw it against the boss. The yoke pin 299 serves as a pivot for the bell crank lever 301, which comprises a latch arm 303 and an actuating arm 305. A spring 307 engages the yoke and the bell crank to bias it in a clockwise direction (Figs. 9 and 10). The latch is provided with a perforated bent-over ear 309, which supports the rod 137 shown in Figs. 3 and 5. The latch arm 303 is provided with a latching shoulder 311, which is adapted to cooperate with one of the edges of the square notch 177 in the latch plate 175 of Fig. 6.

Figures 8 and 11 disclose the hose pull mechanism which comprises in an elongated, depending, transversely concave sleeve 313, which is fixed to one end of a horizontal, pivotally mounted shaft 315, which extends through housing 3. A depending lever 317 is fixed to the shaft 315 and carries at its lower end a pin 319 which extends toward the sleeve 313. The hose 29 is received in sleeve 313 and is attached to said sleeve by a band 321 at the lower end thereof.

Mounted for free rotation upon the shaft 315 between lever 317 and sleeve 313 are two levers 323 and 325. These levers are similarly formed but reversely disposed upon shaft 315. The lever 323 is provided with an upwardly extending arm 327 which forms a shoulder 329 adapted to engage a stop pin 331 which is fixed to the frame of the machine to limit the counterclockwise rotation of said lever. This lever is also provided with a depending shoulder 333 which is adapted to engage the pin 319 described above. A slotted link 335 is attached by means of a rivet 337 to an arm 338 of the lever 323. Lever 325 is provided with an upstanding arm 339 (Fig. 8) adapted to engage the pin 331, a depending shoulder 341 adapted to engage pin 319 and an arm 343 which supports a rivet 345 upon which is mounted the slotted link 347. Links 335 and 347 are connected at their lower ends, by means of a rivet 349, to one end of a lever 351, which is rotatably supported on a portion of the frame 353 by means of a pin 355. The other end of lever 351 is adapted to over-lie the control lever 145 as is clearly shown in Figure 6.

OPERATION OF FLOW INITIATING AND MAINTAINING MECHANISM

If we assume that the resetting operation has been completed as described above, in order to condition the apparatus to discharge fluid, it is necessary for the operator to exert a tension on the dispensing hose 29 so as to swing the sleeve 313 laterally in one direction or the other to rotate shaft 319. Figure 11 discloses the sleeve swung in a clockwise direction to give shaft 315 a rotation in the same direction. Depending lever 317 and pin 319 will be rotated in a clockwise direction as a result of the rotation of shaft 315 and will engage the shoulder 333 of lever 323 to impart a clockwise rotation to the latter. As a result of this motion pin 337 will be lifted and will raise the link 335 which depends therefrom. Link 347 being constrained to move with link 335 will also be lifted and will move relative to the arm 343 due to its slotted connection therewith.

The lever 351 which is connected with links 335 and 347 by pin 349, will be forced to rotate in a counterclockwise direction and due to its overlying relation with lever 145, it will depress the latter causing it to rotate in a clockwise direction. Referring to Fig. 6 it will be remembered that the pawl 157 was seated in notch 151 of disk 149 during the resetting operation; therefore, as lever 145 is rotated by lever 351 as just described, the rotation of depending arm 155 will be transmitted through the medium of pawl 157 and notched disk 149 to the shaft 143 and switch arm 63, which will be rotated in a clockwise direction to lift switch rod 61 against the action of its spring 65 to close the motor switch. As shown in Figures 3, 5 and 14, the tappet 283 of the control valve 265 lies immediately beneath projection 285 of the control lever 145; consequently, the rotation of the latter lever just described will cause the tappet 283 to be depressed and the control valve to be opened. This depression of lever 145 is also sufficient to carry the latch plate downwardly over the latch arm 303 a sufficient distance for shoulder 311 to engage one edge of notch 177 as shown in Figure 12. During the resetting operation, the rod 127 shown especially in Figure 12 was moved so that the pin 129 was withdrawn from contact with ear 309, thereby permitting pawl 303 to be moved into engaging position with the latch plate 175 under the action of its spring 307.

Thus it will be seen, the switch and control valve will be held in their operated positions even though tension on the hose 29 is released to permit shoulder 329 of lever 323 to again abut pin 331 under the action of a suitable retaining spring, not shown. The lever 167 which is adapted to transmit rotation to shaft 143 during the resetting operation is held in its uppermost position due to the action of spring 99, pawl 93 and link 101 during the operation of shaft 143 by the hose pull mechanism. The clutch 153—169 is so formed that the element 153 may rotate clockwise under the action of shaft 143 without carrying with it lever 167. A pull on the hose in the opposite direction from that shown in Figure 11 will actuate lever 325 and link 347 in a manner similar to that just described to produce the same operation of lever 351 and its associated parts as fully described above.

OPERATION OF HOSE PULL PRIOR TO RESETTING

If it is attempted to accomplish a delivery of gasoline before resetting has been initiated by raising the hose hook 41, the attempt will be unsuccessful because pawl 157 will be out of engagement with notch 151 of disk 149 and therefore the control lever 145 will rock idly about shaft 143 without causing operation of the switch. Further, the latch 303 will not maintain the control lever 145 in its operation condition under such circumstances, because the latch is held out of operative position against the action of its spring 307 by means of rod 137 and pin 128 as clearly shown in Figure 3.

Flow Terminating Mechanism

In order to terminate the flow of fluid initiated and maintained by the mechanism described above there is provided in the valve body 19 a chamber 357 which connects with a meter inlet conduit 259. The chamber 357 is provided with the cap member 289 heretofore described, which has a threaded bore 359, which is adapted to receive a spring tensioning member 361 which is provided with a hexagonal outer head 363. A bellows 365 is mounted within the chamber and sealed therefrom by having its flange 365 clamped between the edges of the chamber and the cap 289. The member 361 is bored to slidably receive a rod 367 which at its lower end is provided with a head 369, which is adapted to bear against the bottom head of the bellows. A spring 371 is confined between the head 369 and the spring tensioning member 361 to urge the bellows to extended position against a stop 373. At its upper end rod 367 is provided with an adjustable tappet 375. The head 363 of member 361 is engaged by a spring 297 heretofore described, which serves to maintain member 361 in adjusted position. The tension of spring 371 may be adjusted by rotating the member 361 to vary the amount of pressure in chamber 357, which will be necessary to collapse the bellows. In order to terminate the operation of the dispensing unit, it is necessary to create in the meter inlet line a pressure which is higher than the normal operating pressure, and also higher than the by-pass pressure. The tension of spring 371 is adjusted until the bellows will operate only at a pressure above the by-pass pressure, for the reason that it is frequently necessary in dispensing gasoline to discharge fluid at a very low rate of flow to prevent spillage, and when liquid is being discharged at less than eighty or eighty-five per cent of full flow the pressure in the meter inlet line will be substantially by-pass pressure. Thus it will be seen that were not the bellows adjusted to operate at a pressure as described above, they would be operated before the termination of the dispensing is desired. The pressure necessary to operate the bellows is supplied by the energy of the column of liquid flowing through the apparatus. This energy is transformed into pressure by suddenly stopping the flow of fluid through the device, as by suddenly snapping the nozzle valve shut. The pressures obtained by this operation may vary between 25 and 45 pounds per square inch depending upon the rate of flow of fluid through the device. The by-pass pressures usually rise to a maximum of 17 pounds, therefore it will be seen that the bellows will not be operated by this pressure when they are adjusted to operate at the usual impact or inertia pressure as set forth above. When the nozzle valve is suddenly snapped shut as described, the impact or "water hammer" pressure resulting therefrom will cause the bellows to collapse, to thrust the tappet 375 upwardly to engage the arm 305 of bell crank 301 which lies immediately above it. The bell crank will be given a counter clockwise rotation about pivot 299 against the action of spring 307 and the shoulder 311 will be forced to disengage the edge of notch 177 in latch plate 175. Control lever 145 being thus released will permit shaft 143 and switch lever 163 to be rotated in a counter clockwise direction (Fig. 6) toward the switch off position under the action of switch spring 65 and spring 269 of the control valve. The dispensing operation is not terminated at this time, but the selective mechanical measurement device, to be described below, is given control at this point.

Selective Mechanical Measurement
(Figs. 2, 5, 6, 18, 19, 20, 32, 33, 34, 35)

In Figure 2 is shown a selecting knob 377, which is adapted to be given a rotation of approximately 180 degrees to indicate the positions marked "Gal." or "Mon." The knob is fixed to a shaft 379 which is shown more fully in Figure 18. The shaft is rotatably supported in bearings 381 and has pinned thereto a cam 383 which serves to hold the shaft against axial movement in one direction, while the collar 385 prevents axial movement of said shaft in an opposite direction. Bearings 381 at their upper ends support by means of trunnions 387 a square shaft 389. Attached to one end of the square portion of said shaft 389 is the arm 173 which is slotted at 391 to receive pin 171, which is movable with the control lever 145 as shown in Fig. 6. An arm 393 having a hub 395 is slidably mounted on the square shaft 389 and is adapted to be rotated therewith.

Figure 32:
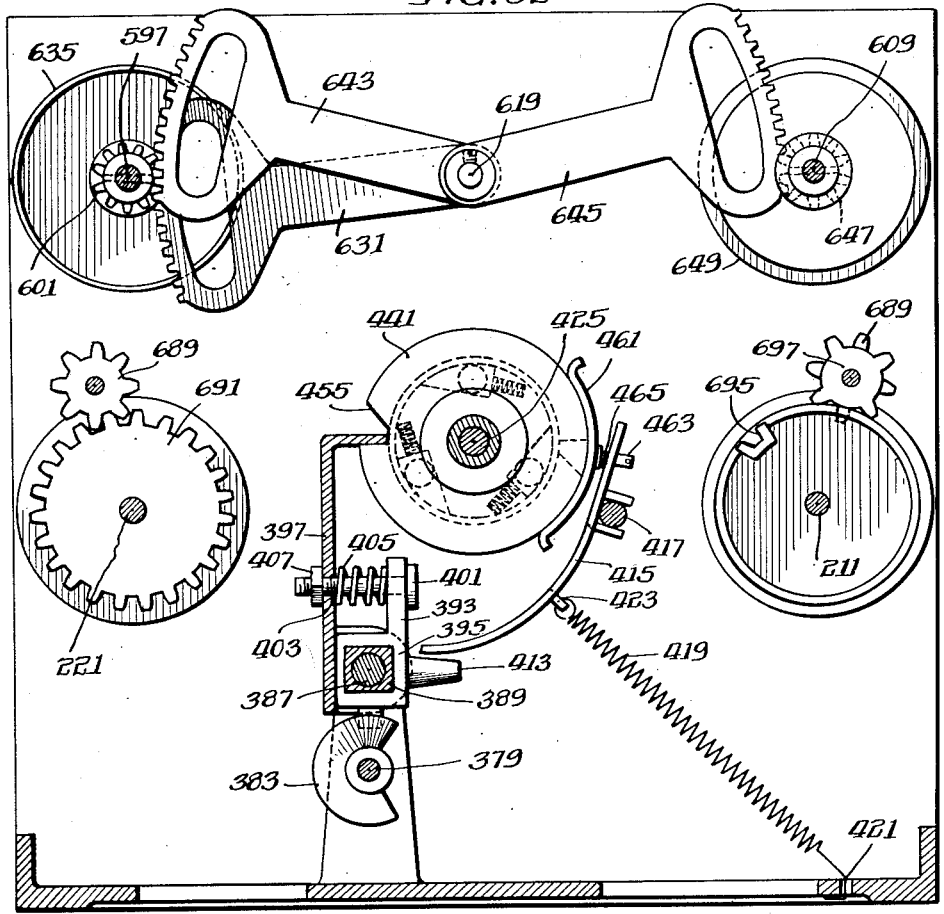
Figure 32 is an elevation showing the unit price setting means and the predetermining mechanism.

A pawl 397 is provided with ears 399 which are bent until they lie in parallel planes and perforated so that they will slidably and rotatably receive the square shaft 389. Hub 395 is confined between the ears. A bolt 401 passes through a perforation in the upper end of arm 393 and perforation 403 in pawl 397. A spring 405 encircles said pawl and lies between the arm and the pawl. A nut 407 is provided to regulate the angular position of pawl 397 with respect to the arm 393. Hub 395 carries a projection 409, which is provided with a notch 411 adapted to receive cam 383. The hub is also provided with a projection 413 against which bears one end of a lever 415, which is mounted for rotation about a pivot 417. A spring 419 is anchored to the clock frame at 421 and to the lever 415 at a point 423 intermediate the pivot 417 and projection 413, as shown in Figure 32.

A rotatable shaft 425 is mounted on bearings on the clock base so that it may be driven by means of a worm wheel 427, worm 429, shaft 431, gear 433, which in turn is driven from the shaft of meter 21. Pinned to the shaft 425, as shown in Fig. 19, is a clutch shell 435.

Mounted for free rotation on shaft 425 is a hub 437, which has fixed thereto by means of pins 439 the gallons disk 441 and the clutch member 443. The latter is provided with notches 445 in which are mounted rolls 447 which are pressed into engagement with the flange 449 of the clutch shell by means of springs 451, as is clearly shown in Figure 20. Thus, when shaft 425 is rotated in one direction, disk 441 will follow, but if the disk turns faster than the shaft in said direction, relative rotation of these members is permitted by the clutch. Also mounted for rotation relative to shaft 425 but driven by the computing mechanism later to be described is a money value disk 453. Disk 441 is provided with a notch 455 which is adapted to be engaged by the pawl 397 while disk 453 is provided with two notches 457, which are also adapted to be engaged by the pawl 397. One or the other of these disks will be contacted by the pawl 397 depending upon the position occupied by knob 377 and the position of the cam 383. When the knob occupies the position to indicate gallons, pawl 397 will be moved along the square shaft 389 into alignment with disk 441 whereas when the knob 377 is turned to indicate money the pawl 397 will be in alignment with the disk 453. A brake shoe 461 is supported by lever 415 above pivot 417 by means of a pin 463, which engages a perforation in said lever 415. A spring 465 is provided between the lever and the shoe 461.

OPERATION OF SELECTIVE MECHANICAL MEASUREMENT

If it be assumed that the operator desires to discharge liquid in predetermined quantities he will first set the knob 377 (Fig. 2) to indicate gallons. Rotation of this knob and shaft 379 to which it is attached will rotate cam 383 to draw the cam follower 409, lever 393 and pawl 397 to the left in Figure 18 to position the pawl 397 opposite the gallons disk 441. Of course this operation is preferably performed at a time when the notches 455 and 457 are in alignment. After resetting has been accomplished and as the control lever 141 is depressed by the hose pull mechanism, the slotted lever 173 will be lifted by means of pin 171 to turn lever 393 together with the square shaft 389 and pawl 397 in a counterclockwise direction, as viewed in Figures 32 to 34 inclusive: The tip or bent-over portion 467 of pawl 397 will accordingly be withdrawn beyond the periphery of disk 441 against the action of spring 419, which is tensioned by the swinging of lever 415 about its pivot in a clockwise direction, Figure 32, under the action of projection 413. The pawl will, of course, be latched in this position by the bellows released latch. In this cocked position of pawl 397 its tip does not bear upon disk 441 and friction between these two elements is avoided. The rotation of lever 415 about its pivot releases brake 461, thereby eliminating the drag of this element upon the disks.

Figure 33:
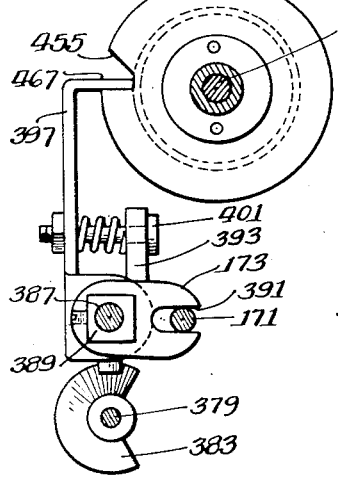
Figure 33 is an elevation showing the stop seated in the notch of the quantity predetermining disc.
Figure 34:
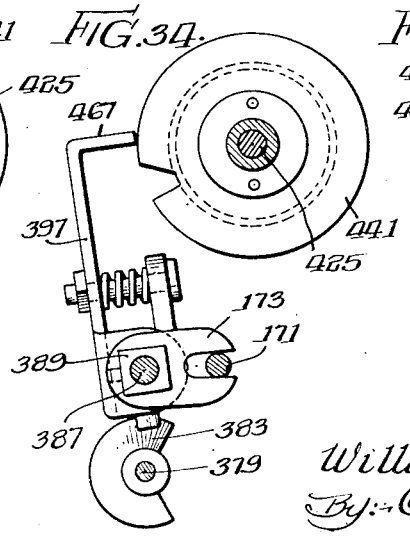
Figure 34 is an elevation showing the stop riding on the periphery of the quantity predetermining disc.
Figure 35:
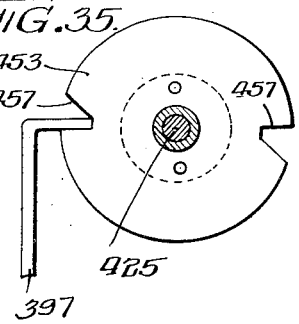
Figure 35 is an elevation showing the stop seated in one of the notches of the money value predetermining disc.
Figure 39:
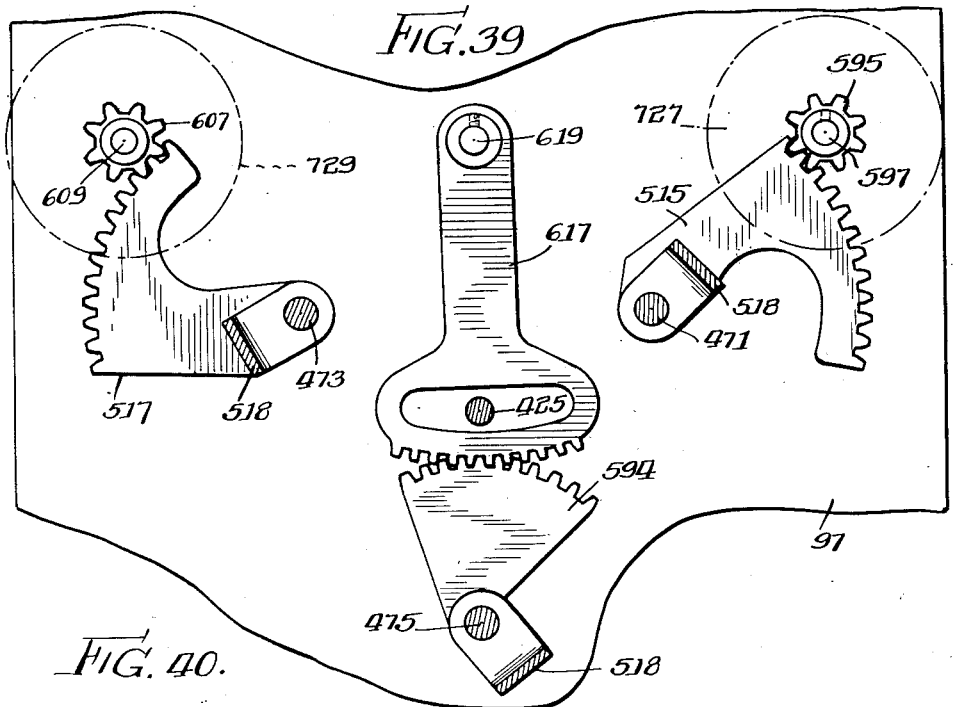
Figure 39 is a section taken on the line 39—39 of Figure 40 showing the unit price setting mechanism.

It will be understood that had it been desired to dispense in increments of money value rather than of quantity, the knob 377 would have been turned to indicate money (see Fig. 2) and the rotation imparted to cam 383 would have carried pawl 397 into alignment with disk 453. The cocking action of pawl would be exactly the same as that just described with respect to disk 441. In the course of delivering a desired quantity of fluid to a customer the operator would suddenly snap the nozzle valve shut when any part of the last half gallon of liquid has been dispensed. This will trip a latch 303 from engagement with the latch plate of control lever 145 to permit it to rotate in a counterclockwise direction (Fig. 6) during which rotation pin 171 would be depressed. Referring to Figures 33 and 34, the depression of pin 171 will cause a clockwise rotation of pawl 397 to such an extent that the tip 467 will engage the periphery of the disk 441 as shown in Figure 34.

Since the pawl is restrained from further movement by the periphery of the disk, control lever 145 and switch lever 63 will be prevented from returning to the "off" position. As disk 441 rotates in response to further delivery of liquid by the operator, notch 455 will approach the tip 467 of the pawl and as the two come into alignment, the pawl will rotate to its furthest clockwise position permitting further depression of pin 171 and rotation of control lever 145 and switch lever 163 to the off position. The control valve stem which has heretofore been held depressed by the projection 285 of the control lever will be permitted to return to its uppermost position, whereby the control valve is closed.

As the pawl 397 swings to its home position, the lever 415 is swung counterclockwise (Fig. 32) to apply the brake 461. Had the pawl 397 been in alignment with the money value disk 453 the operation of the nozzle valve would have been timed to take place when the money value within five cents of the total money value desired appeared on the indicators. Pawl 397 would then have contacted the periphery of disk 453 and as the dispensing was continued, it would have dropped into the notch 457 which first came into alignment with it, thereby terminating the operation.

Should it be necessary or desirable to terminate the motor operation before the switch latching mechanism 175 and 301 has been released by the impact mechanism or if such release has been effected, before the pawl 397 has entered a notch in one of the discs 441 or 453, it will be necessary only to restore the hose hook 41 to the original horizontal position. Such operation of the hose hook will cause a forward motion of rod 137 to rotate the latch 301 about its pivot to release the latch plate 175 if this has not already been accomplished. Further, the rod 127 will be withdrawn to rotate pawl 157 in a counterclockwise direction, Figure 6, to pull said pawl out of contact with disk 149 whereupon the switch operating shaft 143 will be free to rotate under action of the switch spring 65, to open the motor switch 17. The fact that the control lever is held in a somewhat depressed position by reason of the engagement of pawl 397 with the periphery of its cooperating disk is of no moment due to the ineffectiveness of pawl 157.

It is obvious that no operation of the hose pull mechanism will be effective to again start the pump motor since the control lever 145 is entirely disconnected from the switch. The only possible operation which can take place is resetting.

VARIABLE SPEED MECHANISM (Figs. 15 to 19, inc.; 21 to 31, inc.)

The meter driven shaft 45 has fixed thereto a cone gear 467 which has nine steps. A supporting framework 469 is provided to furnish bearings for the ends of said shaft 425 and shafts 471, 473 and 475. Each shaft 471, 473 and 475 is provided with a bell crank lever having one arm 477 which is provided with a finger grip 479 and a projection 481. Pivoted to the projection and extending through a perforation 483 in said lever is a T-shaped lever having a finger grip 485 and having a depending pin 487. A spring 489 is provided between one wall of the perforation and the T-shaped lever and is adapted to rotate said lever in a clockwise direction. The other arm 491 of said bell crank is provided with a pivot 493 upon which is supported a gear 495. A second pivot 497 supports an idler gear 499, which is adapted to mesh with said gear 495 and a gear 501, which is fixed to a hub 503 keyed for sliding motion with respect to said shaft and adapted to transmit rotation thereto.

The arm 491 comprises two parts, 505 and 507, which lie on opposite sides of the gears 495 and 499 and gear 501 with its hub 503. The bell crank is free to rotate about shaft 471 to lift gear 495 away from the gears of the cone with which it is adapted to mesh. So, leaving said gear 495 out of mesh with the cone and sliding the bell crank longitudinally on the shaft 471 it is possible to mesh said gear 495 with any of the nine gears on the cone.

A frame element 509 (Fig. 16) is provided with openings 511, one corresponding to each of the nine gears on the cone and to a neutral position of gear 495 for the reception of the pin 487 attached to the T-shaped lever so as to retain the gear 495 in mesh with the selected step of the cone gear or out of mesh with the cone gear. Referring to Figures 17 and 18, it will be noted that the arm 507 of the bell crank lever is provided with a slotted projection 511, which is adapted to engage a bail 513 which is pivoted on the shaft 471. Each of the shafts 473 and 475 are provided with bell crank levers and gears, etc., which are of the same construction and arrangement as those described in connection with shaft 471, therefore it is not deemed necessary to describe these parts in connection with each of the shafts.

The element 469 is fixed to the elements 509, which in turn are rigidly connected to the clock housing, thereby forming the rigid support for the elements just described. The bails 513 which are associated with shafts 471 and 473 are fixed to operate sectors 515 and 517 respectively, which form part of the price indicating mechanism later to be described.

It is to be noted that when any of the bell cranks 491 are moved to the position shown in Figure 16, whereby the pin 487 engages the innermost opening 511, the gear 495 will be retained entirely out of contact with the cone 467 and will be locked against turning by contact with a portion of element 509. Referring to Figures 18 and 19 especially, the shaft 475 which is the 1/10¢ shaft, drives a gear 519, which drives the first sun gear 521 of the differential mechanism. Mounted for rotation relative to this sun gear on the hub 523 thereof is a planet spider 525. The latter is provided with a gear 527 formed integrally therewith, which is in mesh with a gear 529 fixed to the shaft 473 which is the 1¢ shaft. The spider 525 also carries pins 531 upon which are mounted planetary gears 533 and 535, which are integral with each other. The gear 533 meshes with a second gear 537, formed on the first sun gear 521, while the smaller gear 535 meshes with the second sun gear 539. A second spider 541 is mounted on the hub of the second sun gear and is provided with a gear 543 which is adapted to be driven by a gear 545 on shaft 471, which is the 10¢ shaft. The spider 541 carries pins 547 upon which are mounted planetary gears 549 and 551. Gear 551 meshes with a gear 553 of the second sun gear, while the smaller gear 549 meshes with a gear 555, which is the final driven gear.

The latter is pinned by means of rivets 557 to a gear 559 and a clutch shell 561. A gear 563 is driven from shell 561 by means of a simple roll clutch as shown in Fig. 29. A hub 565 is pinned to rotate with said gear 563 and carries ears 567. A second hub 569 lies in abutting relation with said hub 565 and carries ears 571 through which are threaded adjusting screws 573. By shortening or lengthening the adjusting screws the angularity of hub 569 relative to hub 565 may be adjusted to synchronize a notch in disk 453 which is carried on hub 569 with the indicators which are driven from the gear 563.

It is to be noted that the elements 563, 565 and 569 are mounted to rotate freely upon an elongated hub 575 of the gear 555. The gear 559 meshes with a gear 577 which is mounted to rotate freely upon shaft 475 and which transmits rotation to a gear 579, a shaft 581 and a worm gear 583, which drives the money total counter 584.

Figure 30:
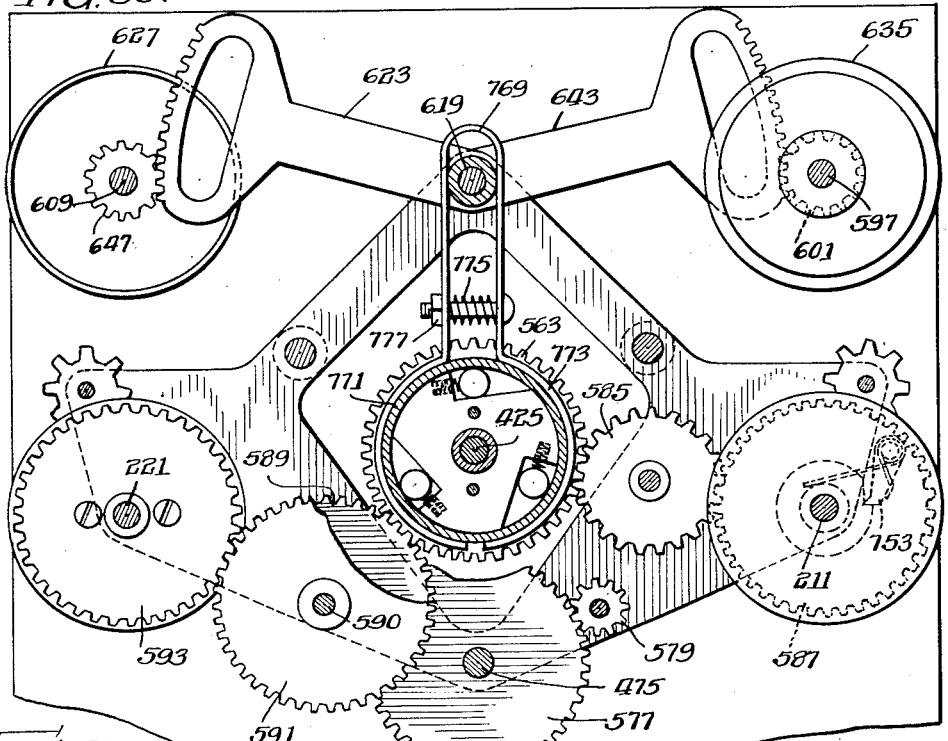
Figure 30 is a section taken on the line 30—30 of Figure 31 showing the drive to the total price dials.
Figure 31:
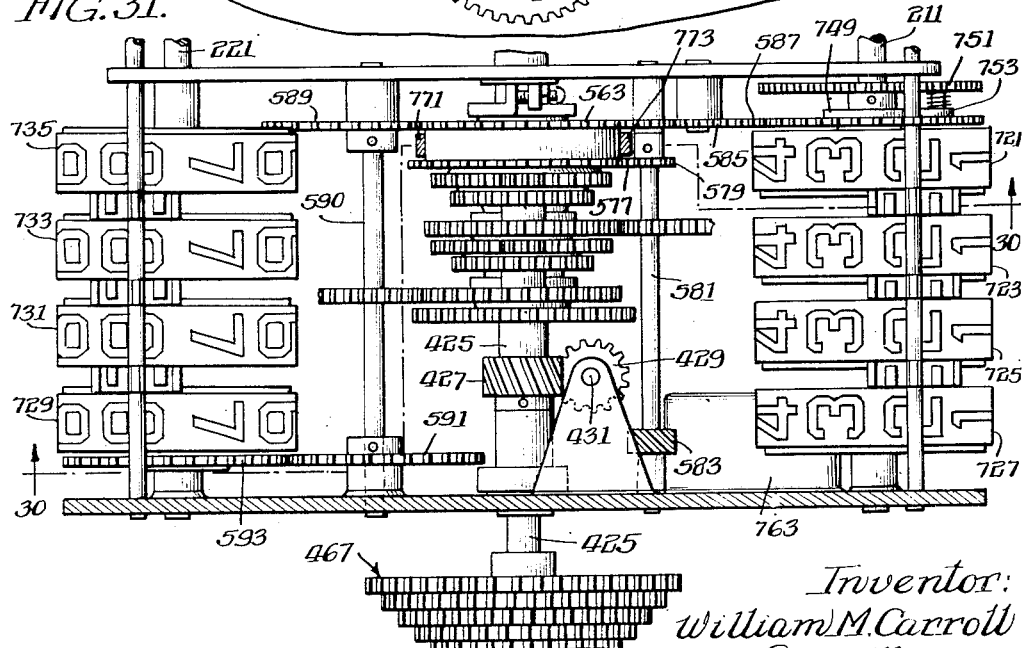
Figure 31 is a plan view of the total price dials and the differential gear set.

Referring to Figures 29, 30 and 31 the gear 563 drives an intermediate gear 585 which in turn drives the gear 587 of the 1¢ wheel of the right hand indicator as shown in the figures referred to. The gear 563 drives through the medium of gear 589, shaft 590, gear 591, the gear 593 of the 1¢ counter wheel of the left hand indicator.

Considering the Figures 18, 30 and 31 it will be seen that a brake mechanism 769 comprising two shoes 771 and 773 embraces the shell or driving member 561 of the clutch which is driven by the variable speed mechanism. A helical spring 775 is mounted on an adjusting bolt 777 which passes through the arms provided to support the brake shoes just described. This spring serves to spread the arms and hence the brake shoes to the fullest extent permitted by the bolt. The shoe supporting arms are joined at their upper ends and embrace the rod 619 to anchor the shoes 771 and 773 against turning with the clutch shell.

A brake of some sort is necessary because, during the resetting operation, the driven element of this clutch is driven in the same direction as it is normally urged by the variable speed mechanism. It is conceivable that a considerable drag might be exerted upon the driving element of the clutch during resetting and in such case the backlash would be taken out of the variable speed gearing. Such backlash would be an appreciable amount due to the great number of gears involved, consequently when the meter again assumed the drive of the clutch, all of this backlash would have to be again taken up before the registers would be driven and as a result, the registers would indicate an amount which was less than that actually delivered.

VARIABLE SPEED MECHANISM—OPERATION

It will be apparent that the gears 495 will receive from the cone gear 467 a rotation, the peripheral speed of which will vary according to the particular steps of said cone gear with which they are enmeshed. When any one of the gears 495 is held in the position shown in Figure 16, it is in engagement with an edge of the element 509 and consequently will be held against rotation and out of contact with the cone gear.

The steps of the cone gears are of such diameters that their peripheral speeds will vary from step to step by a common increment or decrement. Thus, if we assume that a cooperating gear 495 will be driven at a speed $x$ by the smallest step of the cone gear, on being brought into contact with the second step it will be driven at a speed of $2x$, and by the third step at a speed of $3x$ and so on up to the ninth step by which it will be driven at a speed of $9x$. Therefore, it will be seen that provision is made for varying the speed of the gears 495 from zero to nine by intervals of a unit so that the increments of the decimal monetary system used in the United States may readily be set up in the computing mechanism. It is obvious that other systems could readily be accommodated by varying the number of steps on the cone and the ratios of the gearing about to be described.

Inasmuch as the price of the commodity being vended, in this case gasoline and similar products, is quoted in tenth cents, it is necessary that the computation be made in terms of tenth cent as well as cent and ten cent increments. In Figures 15, 18, 19 and 21 the shaft 475 is the 1/10 cent shaft which is connected to drive the first sun gear 521 at a definite speed determined first by the position of the one tenth (1/10) cent gear 495 on the cone gear and second by the ratios of the various co-acting gears in the train.

In Figures 15, 18, 19 and 22 is shown the 1 cent shaft 473 which is connected to drive the first planetary spider 525 at a definite rate of speed determined by the position of the one (1) cent gear 495 on the cone gear and by the ratios of the various co-acting gears in the train.

Similarly, as shown in Figures 15, 18, 19 and 25, the ten cent shaft 471 is connected to drive, by means of gear 545, the second planetary spider 541 at a definite speed depending upon the position of the ten (10) cent gear 495 occupies with respect to the cone 467 and the ratios of the co-acting gears.

Further, since the first sun gear and the planetary spiders are driven by similar gear trains, all will be rotated in the same direction with respect to the shaft 425 and, for purposes of clearness, we shall consider the direction of this rotation as viewed from the right end of the figure in Figure 19 to be clockwise.

If we consider the first sun gear 537 and the first planetary spider 525 as held against motion, the second planetary spider will rotate freely about the second sun gear 553 and will carry with it, in a clockwise direction, the driven gear 555. The speed of the latter gear will not be so great as that of the spider because the gears 551 and 549 in moving about sun gear 553 are given a clockwise rotation which results in a counterclockwise rotation being imparted to the gear 555 and such rotation is subtracted from the clockwise rotation given by the planetary spider. The counterclockwise rotation will be small because the gearing between gear 553 and 555 is reduction gearing as is evident from the drawings. Summarizing then, the gear 555 receives a rotation which is proportional to the setting of the ten cent gear 495 on the cone 467.

If we now assume that in addition to the ten cent gear, the one cent gear 495 is also enmeshed with a step of the cone, the first planetary spider 525 will be driven in a clockwise direction and will carry the second sun gear 553 with it in the same direction at a speed which is somewhat less than the speed of the spider 525 because of the reduction gearing 537, 533, 535 which imparts a slight counterclockwise rotation to gear 539 and consequently to the sun gear 553. The resultant motion of the sun gear 553 is clockwise however and such motion is transmitted through the planetary gears 551 and 549 of the first planetary spider, whereby it is reduced, to produce a clockwise rotation of the final or driven gear 555. Since the rotation of gear 555 which was induced by the gearing of the ten cent order was clockwise, as was established above, and since the rotation of gear 555 induced by the gearing of the one cent order is also clockwise, it will be seen that the total motion induced in gear 555 by the combined action of the two orders is the summation of the individual motions of each of the orders. In other words, the result of the gearing of the one cent order is added to the result of the gearing of the ten cent order.

If we now suppose that instead of remaining stationary, the first sun gear 537 is also driven by the enmeshing of its gear 495 with the cone, it will be seen that its clockwise motion will be transmitted to the sun gear 553 by means of the planetary gears 533 and 535. It will be seen that the direction of this rotation will be clockwise although reduced in magnitude. As described above, any clockwise rotation of the sun gear 553 is reduced and transmitted by the planetary gears 549 and 551 to produce a clockwise motion of the final or driven gear 555, consequently the motion of the one tenth cent order is added the resultant motion induced by the one cent and ten cent orders to produce a motion of gear 555 which is a summation of the individual results of each of the orders.

The resultant motion of the various denominational orders of the computer is transmitted to a gear 559 which is pinned to gear 555 and which drives the gear train of the money total accumulator 584 shown in Figure 15. The same motion is also transmitted to the driving element 561 of a clutch which is connected in the train of mechanism utilized for driving the money value disk 453 and the cost registers shown particularly in Figure 31.

SYNCHRONIZED PRICE INDICATING MECHANISM

*Figures 15, 18, 30, 32, 39 and 40*

Bails 513 were described in connection with the variable speed mechanism, as being rotated as the gear ratio adjusting levers 477 were set to engage the gears 495 with the various steps of the cone. Each of the bails is mounted for free rotation about one of the computer shafts 471, 473, 475 and each drives a gear sector 515, 517, and 594 which is connected with it.

Figure 40:
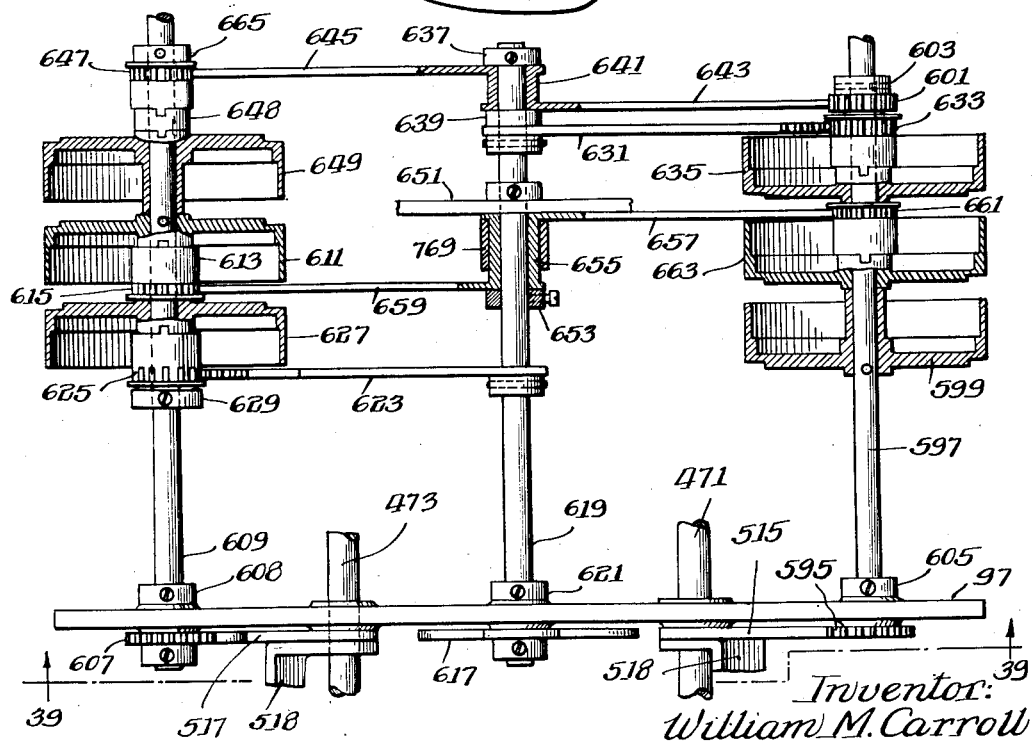
Figure 40 is a plan partly in section showing the unit price setting mechanism.

Sector 515 which is adjusted with the ten cent order of the computer meshes with a gear 595 which is pinned to a shaft 597 extending through the price indicating dials as is clearly shown in Figure 40. The ten cent indicating dial 599 is pinned to rotate with the shaft while the one cent and one tenth cent dials are free to rotate relative to the shaft. A gear 601 is fixed to shaft 597 by means of a pin which extends through hub 603 and the shaft. The shaft is held against longitudinal displacement by means of a collar 605 which is fixed to shaft 597 on the side of the clock frame 97 opposite gear 595.

The sector 517 and its bail 518 are loosely mounted for rotation relative to the one cent computing shaft 473 and are adapted to receive rotation in accordance with the setting of the lever 477 of this order of the mechanism. The rotation of sector 517 is transmitted to the gear 607 which is pinned to operate the shaft 609 which supports the price indicating wheels on this side of the clock. The intermediate or one cent price indicating dial 611 is pinned to the shaft and moves with it, while the other two dials are free to rotate relative to said shaft. A hub 613 having a gear 615 formed integrally therewith is clutched to dial 611 and is turned with it. Shaft 609 is held in position on the frame 97 by a collar 608.

The sector 594 and its bail are mounted for rotation relative to the one-tenth cent computing shaft 471 and are adapted to be set in accordance with the setting of the computing mechanism as in the case of the other sectors. Said sector 594 meshes with a second sector 617 which is fixed to rotate a shaft 619 mounted in bearings in the clock frame 97 and which is held in position with respect thereto by means of the collar 621. Fixed to shaft 619 is a sector 623 which is adapted to mesh with a gear 625 mounted on shaft 609 for rotation with respect thereto and having a hub which is clutched to the one-tenth cent price indicating dial 627. The gear abuts a collar 629 which is fixed to shaft 609. A second sector 631 has its hub pinned to shaft 619 and is in mesh with a gear 633 mounted for rotation on and relative to shaft 597. The hub of this gear is clutched to the one-tenth cent price indicating dial 635.

A collar 637 is pinned to shaft 619 and confined between said collar and a spacer 639 which abuts the hub of sector 631 and mounted for free rotation relative to said shaft is a hub 641. Sectors 643 and 645 are fixed to said hub and the former meshes with gear 601 previously described while the latter meshes with a gear 647 which is mounted for free rotation about shaft 609. The hub of gear 647 is clutched to the ten cent price indicating wheel 649, which is mounted for free rotation on shaft 309, by means of clutch element 648.

Confined between a frame member 651 and a collar 653 on shaft 619 is a freely rotatable hub 655 which is provided with sectors 657 and 659 integrally attached thereto. Sector 657 meshes with a gear 661 which is mounted for free rotation on shaft 597 and which transmits rotation from its hub through a clutch to the one cent price indicating dial 663 which is mounted for free rotation about shaft 597. The other sector 659 meshes with gear 615 which is driven by shaft 609 as explained above.

The clutches, indicating dials, gears, and spacers on shaft 609 are held in abutting relation by means of the collars 629 and 665 which are fixed to the shaft. Similarly, the elements assembled on shaft 597 are retained in the desired relationship by means of dial 599 and hub 603 of gear 601.

SYNCHRONIZED PRICE INDICATING MECHANISM— OPERATION

From the above description it will be seen that as the adjusting lever 477, 479 of the one tenth cent order of the computing mechanism is operated to mesh gear 495 with different steps of the cone gear, the lever will assume different angular positions with respect to the shaft 475. The angular position will change by a uniform amount as each step of the cone is contacted successively. This change of angular position or rotation of the lever is transmitted to the bail 518 and consequently to the gear sectors 594 and 617 and to shaft 619. The sector 623 is fixed to shaft 619 and the motion received therefrom is transmitted to gear 625 and to the one tenth cent dial 627. The other sector 631 which is fixed to shaft 619 transmits motion to gear 633 and consequently to the one tenth cent dial 635. Thus it will be seen that as the one tenth cent order of the computing mechanism is adjusted, a corresponding adjustment of the one tenth cent price indicating dial also takes place.

Similarly, as the one cent order of the computing mechanism is adjusted, the sector 517, gear 607 and shaft 609 will be correspondingly rotated. The one cent dial 611, being fixed to shaft 609, will be adjusted in accordance with the adjustment of the computing mechanism and it will drive the gear 615 to which it is clutched. Gear 615 serves to actuate sector 659, hub 655, sector 657 and gear 661 which is clutched to the one cent dial 663 which is thus driven in unison with dial 611.

The adjustment of the ten cent order of the computing mechanism is transmitted through sector 515, gear 595 and shaft 597 to the ten cent price indicating dial 599. The rotation of said shaft 597 is also transmitted to the ten cent price indicating dial 649 by means of the gear 601, sector 643, hub 641, sector 645, gear 647 and the clutch element 648.

By reason of this mechanism, each time the computing or variable speed mechanism is adjusted to compute at a different price, the price indicating dials will also be adjusted so that they will indicate the price at which computation is being carried on. It is thus impossible to indicate that the apparatus is computing at one price while in fact it is computing at another.

GALLONAGE AND COST REGISTER MECHANISMS

Figures 19, 30, 31, 32, 37, 38 and 41 to 45

Referring to Figures 19 and 38 it will be remembered that shaft 425 is driven by the meter 21 and that the hub 437 is driven at the same speed as the shaft. A gear 667 is fixed to a hub 669 which is provided with ears 671 that lie in overlapping relation with respect to ears 673 on hub 437. Screws 675 pass freely through ears 673 and are threaded through ears 671 and nuts are mounted on the screws in abutting relation with ears 673. By adjusting the nuts on the screws the angular relation of the two hubs may be varied so as to synchronize the quantity indicating dials with the quantity disk 441.

As is shown in Figure 37, gear 667 drives gear 677 which in turn drives gear 679 (Figure 41) which is keyed to the one-tenth gallon indicating dial 681 by means of key 683. Formed integrally with this dial is a Geneva pinion 685 similar to that shown in Figure 43, which serves to drive the Geneva gear 687. The latter gear is formed integrally with the pinion 689 (Figure 44) which meshes with the gear 691 of the gallon indicating dial 693. The dial is provided with a ratchet 694 as shown in Figure 45 while the hub 696 of gear 691 is free to rotate in one direction on the hub of the dial while its rotation in the opposite direction is blocked by reason of the engagement of a spring pressed pawl 698, which is mounted on the hub of gear 691, with the ratchet 694.

Referring again to Figures 37 and 38, it will be seen that the gear 667 mentioned above, meshes with a gear 705 which is pinned to a shaft 707. This shaft carries a gear 709 which is in mesh with gear 711 on the one-tenth gallon indicating dial 713. The gallon and ten gallon indicating dials 715 and 717 respectively are driven from dial 713 by a transfer mechanism which is the same as that shown in Figures 41 to 45 inc., just described.

A total gallons register 763 (Figure 15) is provided to accumulate the total number of gallons dispensed in numerous transactions. This accumulator is driven from meter shaft 431 by a worm 765 (Figure 18) which is pinned to the meter shaft and which drives the worm wheel 767.

The cost registering mechanism is constructed in a manner similar to gallonage register. As was disclosed above, the gear 563 receives a rotation which is the result of the co-action of the various price orders or trains in the computing or speed variating mechanism. In other words, the total number of rotations of gear 563 at a specified time during a dispensing operation represents a product of the number of gallons delivered and the indicated price at that time. These rotations of gear 563 are transmitted to the gear 587 and 593 of the one cent indicating dials 721 and 729 of the cost register through the gearing described in connection with Figures 30 and 31 and the computing or variable speed mechanism. Motion is transferred from one order of dials to the next by means of a Geneva transfer mechanism which is the same as that disclosed in Figures 41 to 45 inc.

GALLONAGE AND COST REGISTER MECHANISMS—
OPERATION

Motion of the meter will be transmitted from shaft 425 through gears 667, 677, 679, and the hub of gear 679 to the one-tenth gallon order dial 681. For every revolution of this dial, a single impulse of one-tenth of a revolution is transmitted through the gearing 685, 687, 689, 691, hub 696, pawl 698, ratchet 694 to the one gallon order dial 693. By means of similar transfer gearing, the ten gallons order dial 701 is moved up one step or one-tenth of a revolution for each revolution of dial 693. By the gearing 667, 705, 707, 709, and 711 motion of meter driven shaft 425 is transmitted to the one-tenth gallon order dial 713 of the second register. In the latter register, the one gallon dial 715 is advanced one step or one-tenth revolution for each revolution of the tenth gallon dial. Similarly the ten gallon dial 717 is advanced one step or one-tenth of a revolution for each revolution of dial 717. It will be seen that the form of the Geneva pinion in the transfer mechanism is such that the Geneva gear will be locked against motion during the interval between transfers, consequently the gears 689, 691, hub 696 and pawl 698 will also be held against motion during such intervals.

Motion of the driven gear 563 of the computer mechanism will be transmitted through gears 585 and 587 to the one cent dial 721. For each revolution of this dial the ten cent dial 723 is advanced one-tenth of a revolution by a mechanism which is similar to those disclosed in Figures 41 to 45. The Geneva pinion 695 advances the gear 695 one-fourth of a revolution for every revolution of the dial thus advancing the 8 tooth pinion 689 by two teeth and the 20 tooth gear by two teeth or one-tenth of a revolution. The ten cent dial drives the one dollar dial and the latter drives the ten dollar dial in a similar manner by similar transfer mechanisms.

Thus, it will be seen, the gallonage dispensed will be indicated to one-tenth of a gallon on each side of the apparatus and at the same time the total price or cost to the nearest cent of the gallonage dispensed will also be displayed.

GALLONAGE AND COST REGISTER RESETTING
MECHANISM

*Figures 30, 31, 36, 37, 38, 41 to 45 inc.*

Shafts 211 and 221 were described as reset shafts in connection with the description of the power resetting mechanism above. Each of these shafts is provided with a V-shaped longitudinal groove 737 as shown in Figures 42 to 45. Seated in a recess 738 in each of the dials 693, 701, 715, 717, 723 to 727 inc. and 731 to 735 inc. is a pawl 739 which is adapted to engage the groove 737 and which is urged toward engaging position by means of a spring 741 which is also mounted in the recess. The pawl is adapted to transmit rotation from the shaft to the dial and to permit relative rotation of the dial with respect to the shaft in the same direction.

With respect to the dials 681 and 721 a different arrangement is necessary. In the case of the dial 681 the drive gear 679 is provided with notched disk 743, Figures 41 and 42. The gear 209 which is in the resetting train of Figure 36, is provided with a pawl 745 which is urged into engagement with disk 743 by a spring 747. The driving gear 587 of dial 721 carries a notched disk 749 while a gear 751 which is pinned to shaft 211 carries a spring pressed pawl 753 which is similar to pawl 745 just described and which is adapted to engage the notch of disk 749.

In Figure 36 is disclosed the adjustable connection between the shaft 73 and gear 205. Attached to the shaft is a hub 755 which carries a pair of spaced projecting ears 757 in to which are threaded the adjusting screws 759. The gear 205 is provided with a projecting lug 761 which is received between the screws 759 and ears 757. By loosening one screw and tightening the other, the relative angular positions of the gear 205 and shaft 73 may be varied.

GALLONAGE AND COST REGISTER RESETTING MECHANISM—OPERATION

It will be recalled that the resetting operation was initiated when the hose hook 41 was raised and that this operation entailed the rotation of shaft 73, gears 205, 207, 209, 223 and 225 (Figure 36). The resetting operation was terminated by mechanism controlled by pin 217 on gear 215. However, the reduction in speed of pin 217 due to the sizes of gears 213 and 215 is such that shaft 73 must make two revolutions to rotate gear 215 and pin 217 one revolution.

The gear trains between shaft 75 and shafts 211 and 221 effect no reduction or increase of speed, consequently the latter shafts also rotate two complete revolutions before the resetting operation is terminated. To revolutions of the reset shafts are provided so that if for any reason a dial is not picked up upon the first revolution of the shaft it will be picked up on the second revolution and resetting of all of the dials to zero is assured.

As the gear 209 rotates during the resetting operation, pawl 745 engages the notched disk 743, and picks up the gear 679 and dial 681. Rotation of gear 679 is transmitted through the gearing 677, 667, 705, 709, and 711 to the dial 713 (Figures 37 and 38) on the opposite side of the clock. The rotation of gear 667 is also transmitted through hub 437 (Figure 19) to the quantity disk 441 which is free to rotate relative to shaft 425 because of the clutch connection between these elements.

The one cent dials 721 and 729 are reset when pawl 753 rotated by gear 751 engages the notch in disk 749. Gear 587 (Figures 30 and 31) rotates gears 585, 589, 563, 591 and 593 which connect the dials in question. Further, by reason of the clutch connection between the money value disk 453 (Figure 19) and the computing or variable speed mechanism, the disk is reset to its initial position by the resetting operation just described.

All of the remaining dials 693, 701, 715, 717, 723, 725, 727, 731, 733 and 735 are returned to the zero position when the pawls 739 seated in the recesses 738 in the dials are picked up by the grooves 737 in the reset shafts as the latter are turned during resetting. The dials are free to turn relative to the gears of the transfer mechanisms due to the pawl and ratchet connection between the dials and the said gears.

It will be seen that by reason of the adjustment of gear 295 relative to shaft 73, the position occupied by the reset shafts and consequently the counters, at the time pawl 93 drops into the notch in the disk 79 of the resetting clutch may be varied. This enables the numerals carried by the dials to be adjusted relative to the openings in the clock faces 40.

It is to be noted that the lever 173 (Figures 33 and 34) is operated by control lever 145 during the resetting operation so that the pawl 397 and brake 451 are drawn out of contact with the disks 441 and 453 during resetting of these elements.

GENERAL DESCRIPTION OF OPERATION

It will be seen from the above detailed description that the apparatus here disclosed lends itself to operation in various optional ways but at the same time it affords protection to the customer who is served from the apparatus. To emphasize these features, the following general description is set forth:

When the pump is unlocked by removal of the padlock 47, the nozzle may be removed from the hose hook 41 to render the latter ready for operation. At the same time the nozzle valve trigger 35 is unlocked and the nozzle spout is free to be removed from the receptacle 45.

If there has been a change of price of the fluid to be dispensed from the apparatus, the operator will adjust the levers 479—485 shown in Figure 15 until the new price appears on the price indicating dials shown in Figures 1 and 40. Simultaneously and automatically, the variable speed mechanism of the computer will be adjusted so that computation of the cost of liquid dispensed during any transaction will be made at the rate displayed on the unit price dials, thus safeguarding the customer against a difference in indicated price and actual rate of computation.

The operator will also take a reading of the total gallonage and money value accumulators 763 and 584 so as to be able to check the business done during the day.

If the operator now desires to serve a customer, he will remove the nozzle from the hose hook and turn the latter to its vertical position. As a further safeguard to the customer, this operation immediately initiates the power resetting of the gallons and cost registers shown in Figure 41 to the zero indicating position, to insure that the final reading on these registers at the end of the transaction will be a result only of that transaction and not carried over from a previous one. This resetting operation is carried to an automatic completion and it cannot be stopped by any efforts of the operator before the register dials return to zero indicating position. When resetting is complete the motor will stop thus saving power if the operator is not yet ready to serve the customer.

Discharge of liquid from the apparatus may now be effected in any one of three ways. If it is desired to discharge an even number of quantity increments, in this case half gallon increments, the operator will set knob 377 to indicate gallons. He will then insert the spout 39 in the receptacle, exert a pull on the hose 29 to start the pump motor 9 and press the nozzle trigger 35. He will maintain the pressure on the trigger until the gallonage register indicates that the last half gallon of the desired quantity is being dispensed, whereupon he will suddenly snap the nozzle valve shut and again open it. The dispensing will continue until the last portion of the last increment has been dispensed and then the pump motor will automatically stop on the even increment. No more gasoline will flow even if the nozzle valve is held open because a check valve usually supplied in the nozzle will close as soon as pressure from the pump is cut off.

The operator may dispense in terms of money value to an exact increment, which in this case is a five cent increment, by setting the knob 377 to indicate money. In this case the pump motor is started by a pull on the hose as explained above, and when the cost register indicates that the last five cents worth of the desired moneys worth of fluid is being dispensed, the operator will suddenly snap the nozzle valve shut and immediately reopen it. Dispensing will continue until the last of the five cents worth is delivered whereupon it will be automatically terminated exactly on the even increment and the pump motor will be shut off.

In either of the above cases, should the customer desire additional fluid, the pump may at once be restarted by again pulling on the hose providing the hose hook 41 has not been returned to the horizontal position. Where an additional delivery is thus made, the quantity and cost thereof will be added to that of the first sale to give the totals of the transaction. But if at any time, the hose hook is returned to the horizontal position, then resetting automatically takes place before another delivery can be accomplished.

Whenever the operation of the apparatus is automatically terminated as described in connection either with a money value or quantity sale, the customer is given an exact quantity or moneys worth of fluid without any guessing or attentiveness on the part of the operator. The latter may devote all of his attention to the rising level of liquid in the tank. Further, in such instances the last portion of the last increment of fluid is dispensed at a slow rate to promote the careful dispensing of this portion of the delivery without extra attention by the operator.

In dispensing either by money or quantity increments, it may be necessary as in the case where the tank is about to overflow, to cease delivering fluid before the apparatus has automatically stopped the motor, that is, before the last full increment has been dispensed. In such a case the operator will simply close the nozzle valve and stop the flow.

Yet a third mode of operation of the apparatus is possible. This is the so-called "conventional" delivery in which the operator either fills up the tank and shuts the nozzle valve as the tank becomes full or else dispenses a stated quantity or moneys worth, by viewing the gallons or cost register and shutting the nozzle when the desired indicia appear upon the selected register. In either this case or in the case of the enforced shutting of the nozzle valve to prevent spillage when using the mechanical measurement mechanism, the motor will generally be left running. If it happens that the notch in the disk which is associated with the pawl at the time is in alignment with the latter and if it happens that the nozzle valve was suddenly snapped shut, then only will the pump motor be shut off under "conventional" or emergency termination of the dispensing operation. If the switch latching mechanism was not operated by the nozzle closure and if the pawl and notch were not in alignment, then it will be necessary for the operator to swing the hose hook to its initial horizontal position to effect a shutting off of the pump motor.

The relief and check valve of Figure 13 taken with the sight glasses and spinners 25 form another protection to the customer. The check valve serves to hold the dispensing line between the nozzle and the inlet to the meter full of fluid under normal conditions but should a leak occur in this portion of the system, gas would become visible in the sight glass 25. Similarly if this portion of the system should happen to be unprimed, no liquid would appear in the sight glass. Thus the customer would be warned in either case that the apparatus was not in proper operating condition. In order to provide this protection the check valve is necessary and since the said column of fluid is thus confined between valves and above ground so as to be subjected to temperature conditions which would cause expansion of the liquid and set up intolerable pressures in the system, the relief valve must be provided to hold such pressures within reasonable values.

It is obvious that various alterations, changes and modifications may be made in the form, construction and arrangement of parts without departing from the scope of the invention as set forth.

Having thus described my invention, what I claim as new and desire to secure by Letters Patent of the United States is:

1. In a fluid dispensing apparatus, flow supplying means, a meter connected to be driven by the flow and connected to drive a speed variator, a cost register connected to be driven by the variator and connected to drive a notched disk, a flow control mechanism, a pawl disposed adjacent the periphery of said disc and connected for movement with said control mechanism, means urging said mechanism toward flow terminating position and said pawl toward said disk, means for holding said pawl and said mechanism away from said disk and said flow terminating position respectively, means operable upon the creation of super by-pass pressures in the line for releasing said pawl for contact with said disk whereby said control mechanism will be moved to flow terminating when said pawl and notch align.

2. In a fluid dispensing apparatus comprising registers provided with indicators having zero indicating positions, means including a meter for displacing said indicator from zero during dispensing and a pump for supplying fluid to said meter, the combination of power means adapted to drive mechanism for resetting said indicators to zero, means for initiating the operation of said power means, automatic means for terminating the operation of said power means when resetting is complete, supplementary means conditioned upon operation of said initiating means for restarting said power means to drive said pump.

3. In a fluid dispensing apparatus comprising registers provided with indicators having zero indicating positions, means including a meter and a power device for driving said indicators from zero, the combination of means for resetting said indicators to zero, mechanism for starting said power device and for connecting it to drive said resetting mechanism, means for automatically stopping said power device and for disconnecting it from said resetting means when resetting is complete, means conditioned upon operation of said starting and connecting mechanism, for restarting said power device for dispensing.

4. In a fluid dispensing apparatus comprising registers provided with indicators having zero indicating positions, means including a meter for driving said indicators from zero during a dispensing operation, fluid dispensing means, including a power device, for driving said meter, the combination of resetting means adapted to be driven by said power device to return said indicators to zero indicating position, means adapted to automatically render said power device inoperative when resetting is completed, means for again rendering said power device operative to dispense fluid, and means controlled by the operator from a point remote from the apparatus for rendering said power device inoperative so as to terminate the dispensing of fluid.

5. In a fluid dispensing apparatus, the combination of a resettable register, resetting means therefor, a meter connected to drive said register, means including a pump and a power device to drive said meter, a switch for controlling said power device, manually operable mechanism for connecting said power device to said resetting means and for closing said switch, automatic means for opening said switch and disabling said connecting mechanism after a predetermined operation of said power device, a second manually operable mechanism adapted to be conditioned for operation by the operation of said first named mechanism for reclosing said switch and manually operable means for reopening said switch at will.

6. In a fluid dispensing apparatus, the combination of a resettable register, resetting means therefor, a meter connected to drive said register, means including a pump and a power device to drive said meter, a switch for controlling said power device, mechanism operable on movement from normal position for connecting said power device to said resetting means and for closing said switch, means for automatically opening said switch and disabling said connecting mechanism after a predetermined operation of said power device, a second mechanism conditioned upon operation of said first named mechanism from normal position, for reclosing said switch, and automatic means under control of the operator for reopening said switch.

7. In a liquid dispensing apparatus, the combination of a power device, control means for said power device, mechanism for moving said control means to position for rendering said power device operative, means for restraining said control means in said position, automatic means for releasing said restraining means after a predetermined operation of said power means has been effected, a second mechanism for thereafter moving said control means to a position for again rendering said power device operative, a second means for restraining said control means in operated position, and a pressure operated device for releasing said last named restraining means.

8. In a fluid dispensing apparatus comprising registers provided with indicators of various orders, having zero indicating positions and adapted to be driven therefrom during dispensing, mechanical measurement means including an element adapted to be driven from a normal position with said indicators, power resetting means comprising resetting shafts upon which said indicators are mounted connections between said shafts and the indicators for restoring said indicators to zero indicating positions, connections between the lowest order of said indicators and said element for transmitting resetting motion thereto, and means for disabling said resetting means when said indicators have returned to zero indicating position and said element to normal position.

9. In a control mechanism, the combination of a quantity register having an element connected to be driven thereby, a cost register having an element connected to be driven thereby, a control device, means including a member connected to actuate said control device and adapted to cooperate with said elements, means mounting said member for movement relative to said elements to permit selective cooperation with one or the other thereof, said member and cooperating element being formed to actuate said control device when they occupy predetermined relative positions.

10. In a control mechanism, the combination of a quantity register having notched disk connected to be driven thereby, a cost register having a notched disk connected to be driven thereby, a pawl mounted for cooperation with said disks and means for selectively shifting said pawl into position to cooperate with one or the other of said disks, a control device connected to be operated by said pawl when said pawl and a notch in the cooperating disk come into alignment.

11. In a control mechanism, the combination of a plurality of registers each connected to drive an associated control element, a control device, a movably mounted member adapted to be selectively disposed in cooperative relation with any of said control elements individually, connections between said control device and said member causing them to be simultaneously operated, said member and selected element being formed to effect movement of said member when they occupy a predetermined relation, latching means adapted to prevent said movement of the member, and means operable at will for rendering said latching means ineffective.

12. In a fluid dispensing apparatus, the combination of flow supplying means including a power device, a switch for controlling said power device, mechanism including a lever movable to and from a normal position and operable upon movement of said lever from normal position to close said switch, means for automatically opening said switch after a predetermined operation of said power device, a second switch closing mechanism, means conditioned by said first named mechanism for enabling said second mechanism to reclose said switch, a mechanical measurement device adapted to be operated to reopen said switch when an exact quantity of fluid has been dispensed, connections between said enabling means and said lever whereby said enabling means will be disabled when the lever is returned to normal to permit immediate reopening of said switch irrespective of said second named mechanism or said mechanical measurement device.

13. In a control mechanism, the combination of a quantity register, a cost register, an element connected to be driven by the quantity register and having stop member actuating means, a second element connected to be driven by the cost register and having stop member actuating means, a stop member mounted for movement into position to cooperate with one or the other of said elements and the actuating means thereof which are adapted to be moved into alignment with said member, the position of said member with respect to the actuating means of either element and the speed relation of said elements and their corresponding registers being such that movement of an actuating means into alignment with the stop member will be accomplished each time a complete unit amount is added to the corresponding register, a control device connected to be actuated by said stop member and means operable at will for conditioning the stop member to actuate said control device at the next succeeding alignment of said member and an actuating means of its cooperating element.

14. In a control mechanism, the combination of a quantity register, a cost register, an element connected to be driven by the quantity register and having stop member actuating means, a second element connected to be driven by the cost register and having stop member actuating means, a stop member mounted for movement into position to cooperate with one or the other of said elements and the actuating means thereof which are adapted to be moved into alignment with said member, the position of said member with respect to the actuating means of either element and the speed relation of said elements and their corresponding registers being such that movement of an actuating means into alignment with the stop member will be accomplished each time a complete unit amount is added to the corresponding register, manually operable means for moving said stop member to select the element with which it is to cooperate, a control device connected to be actuated by said stop member and means operable at will for conditioning the stop member to actuate said control device at the next succeeding alignment of said member and an actuating means of its cooperating element.

15. In a control mechanism, the combination of a quantity register having an element connected to be driven thereby, a cost register having an element connected to be driven thereby, a control device, a stop member connected to actuate said control device, means mounting said stop member for motion selectively into operative relation with one or the other of said elements, and for actuating motion relative to the selected element, to actuate said control device, means for preventing said actuating motion, means operable at will to disable said preventing means, said elements each comprising means adapted, on selection of the element, to cooperate with the stop member to effect actuating motion thereof, when the register to which the selected element is connected completes the accumulation of the unit increment which was being accumulated at the time of disabling of the preventing means.

16. In a control mechanism, the combination of a plurality of registers each connected to drive an associated control element, a control device, a movably mounted member adapted to be selectively disposed in cooperative relation with any of said control elements individually, connections between said control device and said member causing them to be simultaneously operated, means tending to move said member, said selected element being formed to prevent movement of said member at any but a predetermined position of said member, latching means adapted to prevent movement of said member, and means for disabling said latching means so as to place control of movement of said member in said selected element.

17. In a fluid dispensing apparatus, a flow line comprising a control mechanism to initiate or terminate the flow, a meter connected to be driven by the flow, a speed variator connected to be driven by said meter and connected to drive an accumulating cost register, a trip mechanism connected to be operated by said register once at each time a unit cost is accumulated on the register, means connecting said trip mechanism to operate said control mechanism, means for restraining the operation of said trip mechanism, a nozzle valve in the line a pressure responsive device in the line, said device being inoperative under normal line pressures and connected to disable said restraining means when operated, said nozzle valve serving when actuated in a predetermined manner, create an abnormal pressure in said line sufficient to operate said device.

18. In a liquid dispensing device, flow control means adapted to be actuated to permit liquid to be dispensed by the device, a register having means for indicating the volume of liquid dispensed, and means for indicating the cost thereof, means responsive to predetermined movement of a selected one of said indicating means for terminating the dispensing of liquid by said device, and means movable to alternative positions for selecting the indicating means to be used in controlling actuation of said flow control means.

WILLIAM M. CARROLL.